US012806883B2

(12) United States Patent
Akai et al.

(10) Patent No.: US 12,806,883 B2
(45) Date of Patent: Nov. 24, 2026

(54) LAMINATED PRODUCT

(71) Applicant: JAPAN COMPOSITE CO., LTD., Tokyo (JP)

(72) Inventors: Ikuo Akai, Shizuoka (JP); Masahiro Hakotani, Shizuoka (JP)

(73) Assignee: JAPAN COMPOSITE CO., LTD., Tokyo (JP)

( * ) Notice: Subject to any disclaimer, the term of this patent is extended or adjusted under 35 U.S.C. 154(b) by 205 days.

(21) Appl. No.: 18/569,436

(22) PCT Filed: Apr. 1, 2022

(86) PCT No.: PCT/JP2022/017015
§ 371 (c)(1),
(2) Date: Dec. 12, 2023

(87) PCT Pub. No.: WO2022/264661
PCT Pub. Date: Dec. 22, 2022

(65) Prior Publication Data

US 2024/0278530 A1 Aug. 22, 2024

(30) Foreign Application Priority Data

Jun. 17, 2021 (JP) ................................ 2021-101049

(51) Int. Cl.
*B32B 5/26* (2006.01)

(52) U.S. Cl.
CPC .......... *B32B 5/265* (2021.05); *B32B 2250/03* (2013.01); *B32B 2250/20* (2013.01);
(Continued)

(58) Field of Classification Search
CPC . B32B 19/06; B32B 2250/03; B32B 2250/20; B32B 2260/021; B32B 2260/046; B32B 2264/108; B32B 2264/203; B32B 2305/08; B32B 2305/188; B32B 2305/20; B32B 2305/72; B32B 2307/304; B32B 27/12; B32B 27/18; B32B 27/20;
(Continued)

(56) References Cited

U.S. PATENT DOCUMENTS

2004/0044147 A1* 3/2004 Kamae .................. C08G 59/18
525/523
2004/0096680 A1 5/2004 Inoue et al.
(Continued)

FOREIGN PATENT DOCUMENTS

JP 2000102942 A 4/2000
JP 2003-136620 A 5/2003
(Continued)

*Primary Examiner* — Hai Vo
(74) *Attorney, Agent, or Firm* — RANKIN, HILL & CLARK LLP

(57) ABSTRACT

The laminated product sequentially includes a molded layer made of a cured product of a reinforcing fiber and a first resin composition, and a heat-insulating layer made of an inorganic nonwoven fabric and a second resin composition toward one side in the thickness direction. The first resin composition contains a first thermosetting resin and aluminum hydroxide. The second resin composition contains a second thermosetting resin. The first resin composition and the second resin composition are identical to or different from each other.

5 Claims, 6 Drawing Sheets

(52) U.S. Cl.
CPC ... *B32B 2260/021* (2013.01); *B32B 2260/046* (2013.01); *B32B 2264/108* (2013.01); *B32B 2264/203* (2020.08); *B32B 2305/08* (2013.01); *B32B 2305/18* (2013.01); *B32B 2305/20* (2013.01); *B32B 2305/72* (2013.01); *B32B 2307/304* (2013.01)

(58) Field of Classification Search
CPC ........... B32B 5/02; B32B 5/022; B32B 5/024; B32B 5/26; B32B 5/265; B32B 5/28; C08J 5/24
See application file for complete search history.

(56) References Cited

U.S. PATENT DOCUMENTS

| | | | | |
|---|---|---|---|---|
| 2009/0305595 | A1* | 12/2009 | Ogawa | D04H 1/413 252/62 |
| 2018/0223799 | A1 | 8/2018 | Kimura et al. | |

FOREIGN PATENT DOCUMENTS

| | | | |
|---|---|---|---|
| JP | 2006035839 | A | 2/2006 |
| JP | 2006-193590 | A | 7/2006 |
| JP | 4779129 | B2 | 9/2011 |
| JP | 2013-79371 | A | 5/2013 |
| JP | 2013-87133 | A | 5/2013 |
| JP | 2018127964 | A | 8/2018 |
| WO | 2001/072879 | A1 | 10/2001 |

* cited by examiner

LAMINATED PRODUCT

TECHNICAL FIELD

The present invention relates to a laminated product.

BACKGROUND ART

Conventionally, a molded article made of a molding material including a resin (particularly, SMC (sheet molding compound)) has been used in a wide range of fields particularly due to its excellent appearance, mechanical properties, water resistance, and corrosion resistance.

As such a molding material, for example, a thermosetting resin composition containing an unsaturated polyester, aluminum hydroxide, and a fiber reinforcing material has been proposed (for example, Patent Document 1 below). Aluminum hydroxide is blended in this molding material from the viewpoint of improving flame retardancy.

CITATION LIST

Patent Document

Patent Document 1: Japanese Unexamined Patent Publication No. 2013-087133

SUMMARY OF THE INVENTION

Problem to be Solved by the Invention

In recent years, a molded article made of such a molding material has been required to further improve its flame retardancy.

The present invention is to provide a laminated product having excellent flame retardancy.

Means for Solving the Problem

The present invention [1] includes a laminated product sequentially including a molded layer made of a cured product of a reinforcing fiber and a first resin composition, and a heat-insulating layer made of a cured product of an inorganic nonwoven fabric and a second resin composition toward one side in a thickness direction, in which the first resin composition contains a first thermosetting resin and aluminum hydroxide, the second resin composition contains a second thermosetting resin, and the first resin composition and the second resin composition are identical to or different from each other.

The present invention [2] includes the laminated product described in [1], in which the second resin composition contains aluminum hydroxide.

The present invention [3] includes the laminated product described in [1] or [2], in which the second resin composition contains expandable graphite.

The present invention [4] includes the laminated product described in any one of the above-described [1] to [3], in which the first resin composition contains expandable graphite.

The present invention [5] includes the laminated product described in any one of the above-described [1] to [4], including a second heat-insulating layer on the other side in the thickness direction of the molded layer, in which the second heat-insulating layer includes an inorganic fiber woven fabric.

Effects of the Invention

The laminated product of the present invention sequentially includes a molded layer containing aluminum hydroxide, and a heat-insulating layer containing an inorganic nonwoven fabric toward one side in the thickness direction. Therefore, the laminated product has excellent flame retardancy.

BRIEF DESCRIPTION OF THE DRAWINGS

FIG. 2A shows a first step of preparing a molding material and a prepreg, FIG. 2B shows a second step of molding the molding material together with the prepreg, and FIG. 2C shows the produced laminated product.

FIG. 4A shows a third step of preparing a molding material and an inorganic nonwoven fabric, FIG. 4B shows a fourth step of molding the molding material and the inorganic nonwoven fabric, and FIG. 4C shows the produced laminated product.

FIG. 5A shows a first step of preparing a second heat-insulating layer prepreg, together with a molding material and a prepreg, FIG. 5B shows a second step of molding the molding material together with the prepreg and the second heat-insulating layer prepreg, and FIG. 5C shows the produced laminated product.

FIG. 6A shows a third step of preparing a molding material, an inorganic nonwoven fabric, and an inorganic fiber woven fabric, FIG. 6B shows a fourth step of molding the molding material, the inorganic nonwoven fabric, and the inorganic fiber woven fabric, and FIG. 6C shows the produced laminated product.

DESCRIPTION OF THE EMBODIMENTS

In the laminated product of the present invention, a molded layer includes a cured product of a first resin composition, and a heat-insulating layer includes a cured product of a second resin composition. The first and second resin compositions are identical to or different from each other.

In the following, a first embodiment in which the first and second resin compositions are different from each other, and a second resin embodiment in which the first and second resin compositions are identical are described in detail.

First Embodiment

Figure 1:
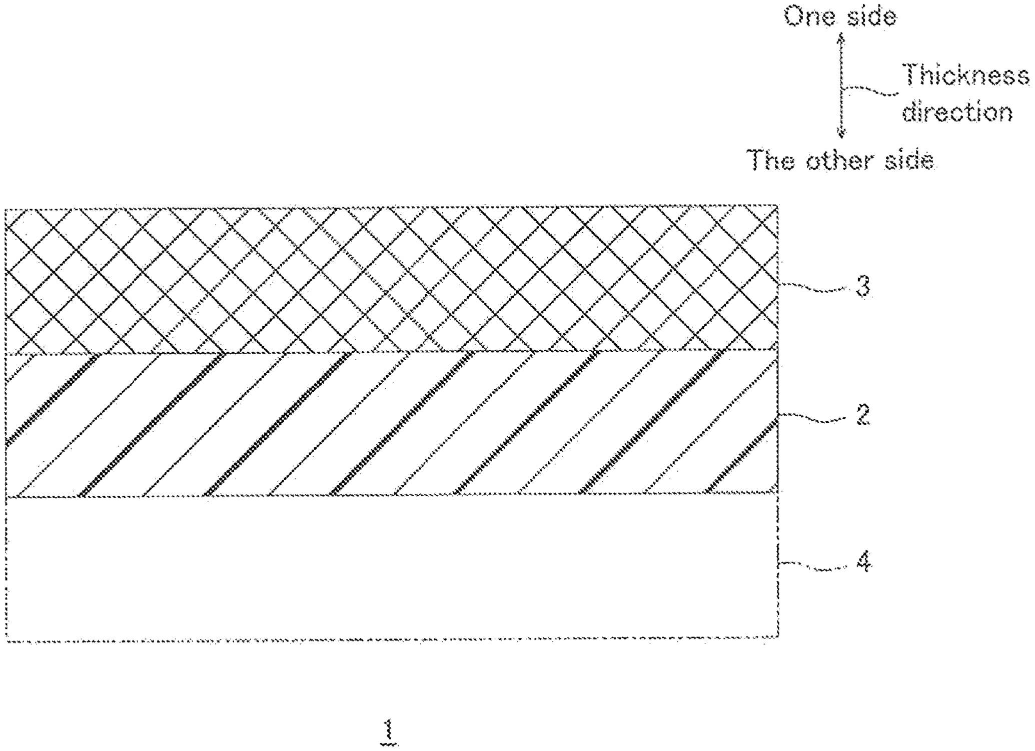
FIG. 1 is a schematic view showing a first embodiment of a laminated product according to the present invention.

With reference to FIG. 1, the first embodiment of the laminated product according to the present invention is described.

In FIG. 1, the up-down direction on the plane of the sheet is referred to as a thickness direction, the upper side on the plane of the sheet is referred to as a one side in the thickness direction, and the lower side on the plane of the sheet is referred to as the other side in the thickness direction. The right-left direction and the depth direction on the plane of the sheet is a plane direction orthogonal to the thickness direction. To be specific, the directions are in conformity with direction arrows of each figure.

<Laminated Product>

As shown in FIG. 1, a laminated product 1 sequentially includes a molded layer 2 and a heat-insulating layer 3 toward one side in the thickness direction. Specifically, a laminated product 1 includes a molded layer 2, and a heat-insulating layer 3 directly disposed on one surface in the thickness direction of the molded layer 2.

In FIG. 1, the laminated product 1 is shaped like a plate, but the shape of the laminated product 1 is not particularly limited, and various shapes may be selected.

<Molded Layer>

The molded layer 2 is disposed on the entire other surface in the thickness direction of the heat-insulating layer 3 so as to be in contact with the other surface in the thickness direction of the heat-insulating layer 3.

In FIG. 1, the molded layer 2 is shaped like a plate, but the shape of the molded layer 2 is not particularly limited, and various shapes may be selected.

The molded layer 2 includes a cured product of a reinforcing fiber and the first resin composition. In detail, the molded layer 2 includes a cured product of a molding material containing a reinforcing fiber and the first resin composition.

The molding material contains the reinforcing fiber and the first resin composition.

[Reinforcing Fiber]

Examples of the reinforcing fiber include inorganic fibers, organic fibers, and natural fibers. Examples of the inorganic fiber include glass fiber, carbon fiber, metal fiber, and ceramic fiber. Examples of the organic fiber include polyvinyl alcohol fiber, polyester fiber, polyamide fiber, fluorine resin fiber, and phenol fiber.

Examples of the natural fiber include hemp and Kenaf.

As the reinforcing fiber, preferably inorganic fiber, more preferably glass fiber is used.

Examples of the form of these reinforcing fibers include cloth, mat, strand, roved, nonwoven fabric, and paper. Examples of the form of cloth include roving cloth. Examples of the form of mat include chopped strand mat, preformable mat, continuous strand mat, and surfacing mat. Examples of the form of strand include chopped strand.

As the form of the reinforcing fiber, preferably a mat form, more preferably a chopped strand form, even more preferably a chopped strand dispersed in an undirected manner in the form of a sheet is used.

The reinforcing fiber preferably does not include inorganic nonwoven fabric (inorganic fiber in the form of nonwoven fabric) to be described later, or inorganic fiber woven fabric (inorganic fiber in the form of cloth) to be described later.

The length of the reinforcing fiber is not particularly limited. The length of the reinforcing fiber is, for example, 0.1 mm or more, preferably 1.5 mm or more, more preferably 5 mm or more, even more preferably 15 mm or more, and for example, 80 mm or less, preferably 40 mm or less.

The blending ratio of the reinforcing fiber (hereinafter referred to as glass fiber content, for example, when the reinforcing fiber is glass fiber) to the total amount of the first resin composition and the reinforcing fiber is, for example, 5% by mass or more, preferably 10% by mass or more, more preferably 20% by mass or more, and for example, 50% by mass or less, preferably 40% by mass or less.

[First Resin Composition]

The first resin composition contains a first resin component and aluminum hydroxide.

The first resin component contains a first thermosetting resin.

Examples of the first thermosetting resin include unsaturated polyester resins, vinyl ester resins, and acrylic syrups. Preferably, an unsaturated polyester resin and a vinyl ester resin are used.

The unsaturated polyester resin contains an unsaturated polyester and a polymerizable monomer.

The unsaturated polyester is a polymerization product of a polybasic acid and a polyhydric alcohol.

The polybasic acid includes a polybasic acid that has an ethylenically unsaturated double bond (hereinafter, referred to as an ethylenically unsaturated bond-containing polybasic acid) as an essential component, and a polybasic acid that does not have an ethylenically unsaturated double bond (hereinafter, referred to as an ethylenically unsaturated bond-free polybasic acid) as an optional component.

Examples of the ethylenically unsaturated bond-containing polybasic acid include an ethylenically unsaturated aliphatic dibasic acid, halogenated products of ethylenically unsaturated aliphatic dibasic acid, and alkyl esters of ethylenically unsaturated aliphatic dibasic acid.

Examples of the ethylenically unsaturated aliphatic dibasic acid include maleic acid, fumaric acid, itaconic acid, and dihydromuconic acid. Further, examples of the ethylenically unsaturated bond-containing polybasic acid include acid anhydrides derived from the above-described ethylenically unsaturated aliphatic dibasic acids. Examples of the acid anhydride derived from the ethylenically unsaturated aliphatic dibasic acid include maleic anhydrides. As the ethylenically unsaturated bond-containing polybasic acid, maleic anhydride and fumaric acid are preferable.

Examples of the ethylenically unsaturated bond-free polybasic acid include saturated aliphatic polybasic acids, saturated alicyclic polybasic acids, aromatic polybasic acids, halides of these acids, and alkyl esters of these acids.

Examples of the saturated aliphatic polybasic acid include saturated aliphatic dibasic acids.

Examples of the saturated aliphatic dibasic acids include oxalic acid, malonic acid, succinic acid, methylsuccinic acid, 2,2-dimethyl succinic acid, 2,3-dimethyl succinic acid, hexylsuccinic acid, glutaric acid, 2-methylglutaric acid, 3-methylglutaric acid, 2,2-dimethylglutaric acid, 3,3-dimethylsuccinic acid, adipic acid, pimelic acid, suberic acid, azelaic acid, and sebacic acid. Examples of the saturated aliphatic polybasic acid include acid anhydrides derived from the above-described saturated aliphatic dibasic acids. Examples of the acid anhydride derived from the saturated aliphatic dibasic acid include oxalic anhydride and succinic anhydride.

Examples of the saturated alicyclic polybasic acid include saturated alicyclic dibasic acids.

Examples of the saturated alicyclic dibasic acid include HET acid, 1,2-hexahydrophthalic acid, 1,1-cyclobutanedicarboxylic acid, 1,4-cyclohexanedicarboxylic acid (cis- or trans-1,4-cyclohexanedicarboxylic acid or a mixture thereof), and dimer acid. Examples of the saturated alicyclic polybasic acid include acid anhydrides derived from the above-described saturated alicyclic dibasic acids. Examples of the acid anhydride derived from the above-described saturated alicyclic dibasic acid include HET anhydride.

Examples of the aromatic polybasic acid include aromatic dibasic acids.

Examples of the aromatic dibasic acid include phthalic acid (orthophthalic acid, isophthalic acid, and terephthalic acid), trimellitic acid, and pyromellitic acid. Further, examples of the aromatic polybasic acid include acid anhydrides derived from the above-described aromatic dibasic acids. Examples of the acid anhydride derived from aromatic dibasic acid include phthalic anhydride.

As the ethylenically unsaturated bond-free polybasic acid, preferably an aromatic polybasic acid, more preferably an aromatic dibasic acid, further more preferably phthalic acid, particularly preferably isophthalic acid is used.

These polybasic acids may be used alone or in combination of two or more.

When the polybasic acid includes an ethylenically unsaturated bond-containing polybasic acid and an ethylenically unsaturated bond-free polybasic acid, the blending ratio of the ethylenically unsaturated bond-containing polybasic acid to the polybasic acid is, for example, 50% by mol or more, preferably 60% by mol or more, and for example, 99% by mol or less, preferably 80% by mol or less.

Examples of the polyhydric alcohol include dihydric alcohols and trihydric alcohols.

Examples of the dihydric alcohol include an aliphatic diol, an alicyclic diol, and an aromatic diol. Examples of the aliphatic diol include alkane diols and ether diols. Examples of the alkane diol include ethylene glycol, propylene glycol (1,2- or 1,3-propanediol or a mixture thereof), butylene glycol (1,2-, 1,3-, or 1,4-butylene glycol or a mixture thereof), 1,5-pentanediol, 1,6-hexanediol, neopentyl glycol, 2-methyl-1,3-propanediol, 2-butyl-2-ethyl-1,3-propanediol, 3-methyl-1,5-pentanediol, 2,2,2-trimethylpentanediol, and 3,3-dimethylolheptane. Examples of the ether diol include diethylene glycol, triethylene glycol, and dipropylene glycol. Examples of the alicyclic diol include cyclohexanediol (1,2-, 1,3-, or 1,4-cyclohexanediol or a mixture thereof), cyclohexanedimethanol (1,2, 1,3-, or 1,4-cyclohexanedimethanol or a mixture thereof), cyclohexanediethanol (1,2-, 1,3-, or 1,4-cyclohexanediethanol or a mixture thereof), and hydrogenated bisphenol A. Examples of the aromatic diol include bisphenol A, ethylene oxide adduct of bisphenol A, and propylene oxide adduct of bisphenol A.

Examples of the trihydric alcohol include glycerin, trimethylolpropane, and triisopropanolamine.

As the polyhydric alcohol, preferably a dihydric alcohol, more preferably an aliphatic diol, even more preferably an alkane diol, particularly preferably propylene glycol and neopentyl glycol is/are used.

These polyhydric alcohols may be used alone or in combination of two or more. Preferably, the polyhydric alcohol includes propylene glycol and neopentyl glycol.

The unsaturated polyester is obtained by polycondensation of a polybasic acid with a polyhydric alcohol.

To carry out the polycondensation of the polybasic acid and the polyhydric alcohol, the polybasic acid and the polyhydric alcohol are first blended in the following equivalent ratio.

The equivalent ratio (hydroxyl group of the polyhydric alcohol/carboxyl group of the polybasic acid) of the polyhydric alcohol to the polybasic acid is, for example, 0.9 or more, preferably 0.95 or more, and for example, 1.2 or less, preferably 1.1 or less.

After blending the polybasic acid and the polyhydric alcohol, the obtained mixture is stirred at a normal pressure under a nitrogen atmosphere to react the polybasic acid with the polyhydric alcohol. The reaction temperature is, for example, 150 °C or more, preferably 190 °C or more, and for example, 250 °C or less, preferably 230 °C or less.

In the above-described reaction, as necessary, a known solvent and a known catalyst can be blended to the mixture.

In this manner, an unsaturated polyester is produced.

The acid value of the unsaturated polyester (measurement method: in conformity with JIS K6901 (2008)) is, for example, 20 mg KOH/g or more, preferably 25 mg KOH/g or more, and for example, less than 40 mg KOH/g, preferably 30 mg KOH/g or less.

The weight average molecular weight of the unsaturated polyester is, for example, 4000 or more, preferably 6000 or more, and for example, 25000 or less, preferably 20000 or less.

The weight average molecular weight is a weight average molecular weight in terms of polystyrene by GPC (gel permeation chromatography). The weight average molecular weight can be determined by GPC measurement of the unsaturated polyester.

Examples of the polymerizable monomer include styrene-based monomers and (meth)acrylic acid ester-based monomers.

Examples of the styrene-based monomer include styrene, vinyltoluene, t-butylstyrene, and chlorostyrene.

Examples of the (meth) acrylic acid ester-based monomer include alkyl (meth) acrylate, allyl (meth) acrylate, cyclic structure-containing (meth) acrylate, hydroxyalkyl (meth) acrylate, alkoxyalkyl (meth) acrylate, aminoalkyl (meth) acrylate, fluoroalkyl (meth) acrylate, and polyfunctional (meth) acrylate. Examples of the alkyl (meth) acrylate includes methyl (meth) acrylate, ethyl (meth) acrylate, isopropyl (meth) acrylate, butyl (meth) acrylate, n-butyl (meth) acrylate, t-butyl (meth) acrylate, isobutyl (meth) acrylate, 2-ethylhexyl (meth) acrylate, lauryl (meth) acrylate, tridecyl (meth) acrylate, and stearyl (meth) acrylate. Examples of the allyl (meth) acrylate include (meth) acrylic acid allyl. Examples of the cyclic structure-containing (meth) acrylate include cyclohexyl (meth) acrylate, benzyl (meth) acrylate, isobornyl (meth) acrylate, glycidyl (meth) acrylate, tetrahydrofurfuryl (meth) acrylate, dicyclopentenyl (meth) acrylate, dicyclopentanyl (meth) acrylate, and dicyclopentenyloxyethyl (meth) acrylate. Examples of the hydroxyalkyl (meth) acrylate include 2-hydroxyethyl (meth) acrylate and 2-hydroxypropyl (meth) acrylate. Examples of the alkoxyalkyl (meth) acrylate include 2-methoxyethyl (meth) acrylate and 2-ethoxyethyl (meth) acrylate. Examples of the aminoalkyl (meth) acrylate include dimethylaminoethyl (meth) acrylate, diethylaminoethyl (meth) acrylate, and chloride salts thereof. Examples of the fluoroalkyl (meth) acrylate include trifluoroethyl (meth) acrylate and heptadecafluorodecyl (meth) acrylate. Examples of the polyfunctional (meth) acrylate include ethylene glycol di (meth) acrylate, diethylene glycol di (meth) acrylate, trimethylolpropane tri (meth) acrylate, pentaerythritol tetra (meth) acrylate, and dipentaerythritol hexa (meth) acrylate.

As the polymerizable monomer, preferably a styrene-based monomer, more preferably styrene is used.

These polymerizable monomers may be used alone or in combination of two or more.

The unsaturated polyester resin is prepared by dissolving the unsaturated polyester in the polymerizable monomer. In the preparation of the unsaturated polyester resin, the blending ratio of the polymerizable monomer to 100 parts by mass of the unsaturated polyester is, for example, 50 parts by mass or more, preferably, 60 parts by mass or more, and for example, 80 parts by mass or less.

After the preparation of the unsaturated polyester resin, when this unsaturated polyester resin is mixed with other components (a vinyl ester resin, an acrylic syrup, a low profile agent (described later), aluminum hydroxide, and an additive (described later)), the polymerizable monomer can be further blended.

The vinyl ester resin contains a vinyl ester and a polymerizable monomer.

The vinyl ester is a reaction product of an epoxy resin and an unsaturated monobasic acid.

Examples of the epoxy resin include bisphenol-type epoxy resins and novolac-type epoxy resins.

Examples of the bisphenol-type epoxy resin include a reaction product of a phenol component and an epoxy component. Examples of the phenol component include bisphenol compounds (e.g., bisphenol A). Examples of the epoxy component include a bisphenol A epoxy compound.

To produce a bisphenol-type epoxy resin, the phenol component is reacted with the epoxy component. Specifically, the phenol component and the epoxy component are blended and reacted.

In the above-described reaction, the blending ratio of the epoxy component to 1 equivalent of the phenol component is, for example, 1.5 equivalents or more, preferably 2.0 equivalents or more, more preferably 3.0 equivalents or more, and for example, 5.0 equivalents or less, preferably 4.0 equivalents or less.

In the above-described reaction, as necessary, a catalyst can be added to the mixture.

Examples of the catalyst include amines, quaternary ammonium salts, imidazoles, and phosphines. Examples of the amines include triethylamine and benzyldimethylamine. Examples of the quaternary ammonium salts include tetramethylammonium chloride and triethylbenzylammonium chloride. Examples of the imidazoles include 2-ethyl-4-imidazole. Examples of the phosphines include triphenylphosphine.

As the catalyst, preferably a quaternary ammonium salt, more preferably triethylbenzylammonium chloride is used.

These catalysts may be used alone or in combination of two or more.

The blending ratio of the catalyst to 100 parts by mass of the total amount of the phenol component and the epoxy component is, for example, 0.01 parts by mass or more, and for example, 1.0 part by mass or less, preferably 0.1 parts by mass or less.

In the above-described reaction, the reaction temperature is, for example, 100 °C or more, preferably 130 °C or more, and for example, 180 °C or less.

In this manner, a bisphenol-type epoxy resin is produced.

The epoxy equivalent of the bisphenol-type epoxy resin is, for example, 150 g/eq or more, preferably 250 g/eq or more, and for example, 800 g/eq or less, preferably 400 g/eq or less, more preferably 350 g/eq or less.

When two kinds of the bisphenol-type epoxy resin are used in combination, the epoxy equivalent is an epoxy equivalent of all the bisphenol-type epoxy resins obtained by multiplying the epoxy equivalent of each of the bisphenol-type epoxy resins by the mass ratio of each of the bisphenol-type epoxy resins to the total amount of the bisphenol-type epoxy resins and adding up the products of the epoxy equivalents and the mass ratios.

The novolac-type epoxy resin is, for example, a reaction product of novolac and epichlorohydrin.

Alternatively, a commercially available product may be used as the epoxy resin.

Examples of the unsaturated monobasic acid include monocarboxylic acids and a reaction product of a dibasic acid anhydride and an alcohol having at least one unsaturated group in a molecule.

Examples of the monocarboxylic acid include (meth)acrylic acid, crotonic acid, cinnamic acid, and sorbic acid. Used herein, the "(meth)acryl" refers to methacryl and/or acryl.

Examples of the dibasic acid anhydride include maleic anhydride, succinic anhydride, phthalic anhydride, tetrahydrophthalic anhydride, and hexahydrophthalic anhydride. Examples of the alcohol having an unsaturated group include hydroxyethyl (meth)acrylate, hydroxypropyl (meth)acrylate, hydroxybutyl (meth)acrylate, pentaerythritol tri(meth)acrylate, and glycerin di(meth)acrylate.

As the unsaturated monobasic acid, preferably monocarboxylic acid, more preferably (meth)acrylic acid, even more preferably methacrylic acid is used.

These unsaturated monobasic acids may be used alone or in combination of two or more.

In the reaction of the epoxy resin with the unsaturated monobasic acid, an addition reaction of the epoxy group of the epoxy resin and the unsaturated monobasic acid occurs.

In the above-described reaction, an equivalent of the carboxyl group of the unsaturated monobasic acid with respect to the epoxy group of the epoxy resin is, for example, 0.8 or more, preferably 1.0 or more, and for example, 1.5 or less, preferably 1.2 or less.

In the above-described reaction, as necessary, a catalyst can be added to the mixture.

Examples of the catalyst include the same catalysts listed as the catalysts of the above-described reaction of the phenol component and the epoxy component. As the catalyst, preferably a quaternary ammonium salt, more preferably triethylbenzylammonium chloride is used.

The blending ratio of the catalyst to 100 parts by mass of the epoxy resin is, for example, 0.01 parts by mass or more, preferably 0.05 parts by mass or more, and for example, 1.0 part by mass or less, preferably 0.6 parts by mass or less.

In the above-described reaction, if necessary, a polymerization inhibitor (described later) (preferably, hydroquinone)) can be added thereto.

The blending ratio of the polymerization inhibitor to 100 parts by mass of the epoxy resin is, for example, 0.01 parts by mass or more, preferably 0.05 parts by mass or more, and for example, 0.5 parts by mass or less, preferably 0.1 parts by mass or less.

In the above-described reaction, the reaction temperature is, for example, 80 °C or more, preferably 100 °C or more, and for example, 150 °C or less, preferably 130 °C or less.

The above-described reaction can also be carried out subsequently to the above-described reaction of the phenol component and epoxy component.

In this manner, a vinyl ester is produced.

The acid value of the vinyl ester (measurement method: in conformity with JIS K6901 (2008)) can be determined from the charging ratio of the epoxy resin to the unsaturated monobasic acid. The acid value is, for example, 1 mg KOH/g or more, and for example, 20 mg KOH/g or less, preferably 10 mg KOH/g or less.

Examples of the polymerizable monomer include those illustrated for the unsaturated polyester resin. Preferably a styrene-based monomer, more preferably styrene is used.

The vinyl ester resin is prepared by dissolving the vinyl ester in the polymerizable monomer. In the preparation of the vinyl ester resin, the blending ratio of the polymerizable monomer to 100 parts by mass of the unsaturated polyester is, for example, 50 parts by mass or more, preferably, 60 parts by mass or more, and for example, 80 parts by mass or less.

These first thermosetting resins can be used alone or in combination of two or more. Preferably, an unsaturated polyester resin and a vinyl ester resin are used in combination. When the unsaturated polyester resin and the vinyl ester resin are used in combination, the blending ratio of the unsaturated polyester to 100 parts by mass of the total amount of the unsaturated polyester and the vinyl ester is, for example, 70 parts by mass or more, preferably 80 parts by mass or more, and for example, 90 parts by mass or less. The blending ratio of the vinyl ester is, for example, 10 parts by mass or more, and for example, 30 parts by mass or less, preferably 20 parts by mass or less.

The first resin component preferably contains a low profile agent.

The low profile agent is blended to suppress cure shrinkage and thermal shrinkage of the molded layer 2 produced by using the first resin composition.

Examples of the low profile agent include polyethylene, polystyrene, styrene thermoplastic elastomer, cross-linked polystyrene, polyvinyl acetate-polystyrene block copolymer, polyvinyl acetate, polymethylmethacrylate, and saturated polyester resin. Preferably, polyethylene and polystyrene are used.

These low profile agents may be used alone or in combination of two or more. Preferably, polyethylene and polystyrene are used in combination.

The blending ratio of the low profile agent to 100 parts by mass of the first resin component is, for example, 1 part by mass or more, preferably 5 parts by mass or more, and for example, 20 parts by mass or less, preferably 15 parts by mass or less.

The aluminum hydroxide is blended to give flame retardancy, and to give transparency and color depth to the molded layer 2 produced by using the first resin composition.

The blending ratio of the aluminum hydroxide to 100 parts by mass of the first resin component is 30 parts by mass or more, preferably 50 parts by mass or more, more preferably 100 parts by mass or more, and 300 parts by mass or less, preferably 200 parts by mass or less.

The average particle size of the aluminum hydroxide is, for example, 1 μm or more, and for example, 50 μm or less, preferably 25 μm or less.

The average particle size of the aluminum hydroxide can be determined by creating a particle size distribution curve with a laser diffraction-scattering particle size distribution measurement device and calculating the particle size corresponding to 50% by mass.

The first resin composition is produced by blending the first resin component and the aluminum hydroxide in the above-described blending ratio.

Further, if necessary, an additive may be blended into the first resin composition as long as it does not damage the effects of the present invention.

Examples of the additive include expandable graphite, polymerization inhibitors, curing agents, release agents, coloring agents, wetting and dispersing agents, thickening agents, flame retardants, fillers, pattern materials, antibacterial agents, hydrophilic agents, photocatalysts, ultraviolet absorbers, ultraviolet stabilizers, separation inhibitors, silane coupling agents, antistatic agents, thixotropic agents, thixo stabilizers, and polymerization accelerators. These additives may be used alone or in combination of two or more.

The expandable graphite is a graphite intercalation compound produced by inserting, for example, sulfuric acid between the layers of scale-shaped natural graphite. The interlayers expand and are swollen at approximately 150 to 300 °C. The expandable graphite is the graphite intercalation compound before the heating.

The blending ratio of the expandable graphite to 100 parts by mass of the first resin component is 3 parts by mass or more, preferably 5 parts by mass or more, and 10 parts by mass or less, preferably 8 parts by mass or less.

When the blending ratio of the expandable graphite is the above-described lower limit or more, the molded layer 2 produced by using the unsaturated polyester resin composition has excellent flame retardancy.

The average particle size of the expandable graphite is 150 μm or less, preferably 100 μm or less, and for example, 10 μm or more, preferably 50 μm or more.

The average particle size of the expandable graphite can be obtained by observing the expandable graphite under an optical microscope, measuring the longest diameter (long diameter) and the particle size (short diameter) in a direction orthogonal to the longest diameter of each of arbitrarily selected 50 particles of the expandable graphite, and calculating the average value of the long diameters and short diameters.

A commercially available product may be used as the expandable graphite. Specifically, 9510045 manufactured by Ito Graphite Co., Ltd. is used.

The polymerization inhibitor is blended in order to adjust the pot life and the curing reaction.

Examples of the polymerization inhibitor include hydroquinone compounds, benzoquinone compounds, catechol compounds, phenol compounds, and N-oxyl compounds. Examples of the hydroquinone compound include hydroquinone, methylhydroquinone, and t-butylhydroquinone. Examples of the benzoquinone compound include p-benzoquinone and methyl-p-benzoquinone. Examples of the catechol compound include t-butylcatechol. Examples of the phenol compound include 2,6-di-t-butyl-4-methylphenol and 4-methoxyphenol. Examples of the N-oxyl compound include 1-oxyl-2,2,6,6-tetramethylpiperidine, 1-oxyl-2,2,6,6-tetramethylpiperidine-4-ol, 4-hydroxy-2,2,6,6-tetrapiperidine-1-oxyl, 4-methoxy-2,2,6,6-tetramethylpiperidine-1-oxyl, 1-oxyl-2,2,6,6-tetramethylpiperidine-4-yl-acetate, 1-oxyl-2,2,6,6-tetramethylpiperidine-4-yl-2-ethylhexanoate, 1-oxyl-2,2,6,6-tetramethylpiperidine-4-yl-stearate, 1-oxyl-2,2,6,6-tetramethylpiperidine-4-yl-4-t-butylbenzoate, bis(1-oxyl-2,2,6,6-tetramethylpiperidine-4-yl) succinate ester, bis(1-oxyl-2,2,6,6-tetramethylpiperidine-4-yl) adipic acid ester, bis(1-oxyl-2,2,6,6-tetramethylpiperidine-4-yl) sebacate, bis(1-oxyl-2,2,6,6-tetramethylpiperidine-4-yl) n-butylmalonic acid ester, bis(1-oxyl-2,2,6,6-tetramethylpiperidine-4-yl) phthalate, bis(1-oxyl-2,2,6,6-tetramethylpiperidine-4-yl) isophthalate, bis(1-oxyl-2,2,6,6-tetramethylpiperidine-4-yl) terephthalate, bis(1-oxyl-2,2,6,6-tetramethylpiperidine-4-yl) hexahydroterephthalate, N,N'-bis(1-oxyl-2,2,6,6-tetramethylpiperidine-4-yl) adipamide, N-bis(1-oxyl-2,2,6,6-tetramethylpiperidine-4-yl) caprolactam, N-bis(1-oxyl-2,2,6,6-tetramethylpiperidine-4-yl) dodecyl succinimide, 2,4,6-tris-[N-butyl-N-(1-oxyl-2,2,6,6-tetramethylpiperidine-4-yl)]-s-triazine, and 1-oxyl-2,2,6,6-tetramethylpiperidine-4-one.

As the polymerization inhibitor, preferably a benzoquinone compound, more preferably p-benzoquinone is used.

These polymerization inhibitors may be used alone or in combination of two or more.

The blending ratio of the polymerization inhibitor to 100 parts by mass of the first resin component is, for example, 0.01 parts by mass or more, and for example, 0.1 parts by mass or less.

Examples of the curing agent include peroxides. Examples of the peroxide include benzoyl peroxide, t-butyl peroxyisopropyl monocarbonate, t-amyl peroxyisopropyl monocarbonate, t-hexyl peroxyisopropyl monocarbonate, 1,1-bis(t-butyl peroxy)cyclohexane, t-butyl peroxy-2-ethylhexanoate, amylperoxy-2-ethylhexanoate, 2-ethylhexylperoxy-2-ethylhexanoate, t-butyl peroxybenzoate, t-hexyl peroxybenzoate, and t-hexyl peroxyacetate. Preferably, t-butyl peroxyisopropyl monocarbonate is used.

These curing agents may be used alone or in combination of two or more.

The blending ratio of the curing agent to 100 parts by mass of the resin component is, for example, 0.1 parts by mass or more, preferably 0.5 parts by mass or more, and for example, 5 parts by mass or less, preferably 1 part by mass or less.

Examples of the release agent include fatty acids, fatty acid metal salts, paraffins, liquid waxes, fluorine polymers, and silicon-based polymers. Examples of the fatty acid include stearic acid and lauric acid. Examples of the fatty acid metal salt include zinc stearate and calcium stearate.

As the release agent, preferably a fatty acid metal salt, more preferably zinc stearate is used.

These release agents may be used alone or in combination of two or more.

The blending ratio of the release agent to 100 parts by mass of the resin component is, for example, 1 part by mass or more, preferably 3 parts by mass or more, and for example, 10 parts by mass or less.

The coloring agent is not particularly limited. Examples of the coloring agent include polyester toner produced by mixing known pigments such as titanium oxide, carbon black, bengara, and phthalocyanine blue.

As the coloring agent, preferably, polyester toner is used.

These coloring agents may be used alone or in combination of two or more.

The blending ratio of the coloring agent to 100 parts by mass of the resin component is, for example, 1 part by mass or more, preferably 5 parts by mass or more, and for example, 20 parts by mass or less.

The wetting and dispersing agent is blended to optimize the viscosity of the first resin composition.

Examples of the wetting and dispersing agent include a copolymer having an acid group, phosphoric acid polyester, and an alkylammonium salt.

As the copolymer having an acid group, specifically, for example, BYK-W995, BYK-W996, or BYK-W9010 (hereinabove manufactured by BYK-CHEMIE) can be used.

Examples of the alkylammonium salt include an alkylammonium salt of a high-molecular weight copolymer. Specifically, for example, BYK-W9076 with an amine value of 44 mg KOH/g and an acid value of 38 mg KOH/g manufactured by BYK-CHEMIE can be used.

These wetting and dispersing agents may be used alone or in combination of two or more. As the wetting and dispersing agent, preferably, a copolymer having an acid group and an alkylammonium salt can be used in combination.

The blending ratio of the wetting and dispersing agent to 100 parts by mass of the first resin component is, for example, 0.1 parts by mass or more, preferably 0.3 parts by mass or more, more preferably 1 part by mass or more, and for example, 5 parts by mass or less, preferably 2 parts by mass or less.

A thickening agent is blended so as to increase the viscosity of the first resin composition to a suitable value for heat compression molding. The thickening agent is preferably blended before (preferably, immediately before) impregnating the first resin composition into the reinforcing fiber (described later).

Examples of the thickening agent include alkaline earth metal oxides and alkaline earth metal hydroxides. Examples of the alkaline earth metal oxide include magnesium oxide. Examples of the alkaline earth metal hydroxide include magnesium hydroxide and calcium hydroxide.

As the thickening agent, preferably alkaline earth metal oxide, more preferably magnesium oxide is used.

These thickening agents may be used alone or in combination of two or more.

The blending ratio of the thickening agent to 100 parts by mass of the first resin component is, for example, 0.5 parts by mass or more, and for example, 10 parts by mass or less, preferably 3 parts by mass or less.

A flame retardant is mixed with the molded layer 2 produced by using the first resin composition to give flame retardancy thereto.

Examples of the flame retardant include halogen flame retardants and non-halogen flame retardants. Examples of the halogen flame retardant include a bromine-based flame retardant. Examples of the non-halogen flame retardant include a phosphorus-based flame retardant, an inorganic flame retardant, and a nitrogen compound-based flame retardant.

The blending ratio of the flame retardant to 100 parts by mass of the first resin component is, for example, 1 part by mass or more, preferably 5 parts by mass or more, and for example, 50 parts by mass or less, preferably 20 parts by mass or less.

Examples of the filler include inorganic fillers (excluding aluminum hydroxide).

Examples of the inorganic filler include oxides, hydroxides (excluding aluminum hydroxide), carbonates, sulfates, silica, glass powders, hollow fillers, silicates, fluorides, phosphates, and clay minerals. Examples of the oxide include alumina and titania. Examples of the hydroxide include magnesium hydroxide. Examples of the carbonates include calcium carbonate. Examples of the sulfates include barium sulfate. Examples of the silica include crystalline silica, fused silica, fumed silica, and dry silica (AEROSIL). Examples of the hollow filler include glass balloon, silica balloon, and alumina balloon. Examples of the silicates include silica sand, diatomaceous earth, mica, clay, kaolin, and talc. Examples of the fluoride include fluorite. Examples of the phosphate include calcium phosphate. Examples of the clay mineral include smectite.

These fillers may be used alone or in combination of two or more.

The blending ratio of the filler to 100 parts by mass of the first resin component is, for example, 1 part by mass or more, preferably 3 parts by mass or more, and for example, 50 parts by mass or less, preferably 30 parts by mass or less.

To produce the first resin composition, when the first thermosetting resin is mixed with other components (a low profile agent, aluminum hydroxide, and an additive), the polymerizable monomer can be further blended.

The molding material is then produced by impregnating the first resin composition with the reinforced fiber.

The thickness of the molded layer 2 is, for example, 1 mm or more, preferably 1.5 mm or more, and for example, 5 mm or less, preferably 2.5 mm or less.

<Heat-Insulating Layer>

The heat-insulating layer has a sheet shape. The heat-insulating layer 3 is disposed on the entire one surface in the thickness direction of the molded layer 2 so as to be in contact with one surface in the thickness direction of the molded layer 2.

The heat-insulating layer 3 includes a cured product of an inorganic nonwoven fabric and the second resin composition. In detail, the heat-insulating layer 3 includes a cured product of a prepreg containing an inorganic nonwoven fabric and the second resin composition.

The prepreg contains an inorganic nonwoven fabric and the second resin composition.

[Inorganic Nonwoven Fabric]

The inorganic nonwoven fabric is, for example, inorganic fiber in the form of nonwoven fabric.

The inorganic nonwoven fabric is shaped in the form of mat by depositing and/or intertwining inorganic fibers. In detail, in the inorganic nonwoven fabric, inorganic fibers are not interwoven with each other, and inorganic fibers are randomly deposited and/or intertwined in the in-plane direction and/or thickness direction of the inorganic nonwoven fabric. That is, as described in detail below, the inorganic nonwoven fabric is distinguished from an inorganic fiber woven fabric in which inorganic fibers are interwoven with each other.

Examples of the inorganic nonwoven fabric include fiber paper and fiber felt. In particular, fiber felt produced by combining mechanical actions such as needle punching to bond fibers is excellent in terms of flame retardancy compared to chemical bonding methods such as a binder.

Examples of the inorganic fiber in the inorganic nonwoven fabric include glass fiber, ceramic fiber, carbon fiber, silicon carbide fiber, and boron fiber. Preferably, glass fiber and carbon fiber are used.

The basis weight of the inorganic nonwoven fabric is, for example, 50 $g/m^2$ or more, preferably 80 $g/m^2$ or more, and for example, 1000 $g/m^2$ or less.

[Second Resin Composition]

The second resin composition contains a second resin component.

The second resin component contains a second thermosetting resin, and if necessary, the above-described low profile agent.

Examples of the second thermosetting resin include unsaturated polyester resins, vinyl ester resins, and acrylic syrups. Preferably, an unsaturated polyester resin and a vinyl ester resin are used.

The second resin composition preferably contains aluminum hydroxide. When the second resin composition contains aluminum hydroxide, it is excellent in flame retardancy.

The second resin composition preferably contains expandable graphite. When the second resin composition contains expandable graphite, it is excellent in flame retardancy.

The second resin composition may contain the additive (except expandable graphite) illustrated for the first resin composition.

In the first embodiment, the first resin composition is different from the second resin composition. Specifically, in the first and second thermosetting resins, the type and/or the blending ratio is/are different from each other, and/or the components other than the first thermosetting resin (aluminum hydroxide and additive) and the components other than the second thermosetting resin (aluminum hydroxide and additive) are different from each other.

More specifically, the blending ratio of the aluminum hydroxide to 100 parts by mass of the second resin component is less than the blending ratio of the aluminum hydroxide to 100 parts by mass of the first resin component, and is specifically, for example, 20 parts by mass or more, and for example, 130 parts by mass or less, preferably 90 parts by mass or less. When the first resin composition does not contain expandable graphite, the second resin composition preferably contains expandable graphite from the viewpoint of improving flame retardancy.

The second resin composition can be prepared in the same manner as the first resin composition.

The prepreg is then produced by impregnating the second resin composition with the inorganic nonwoven fabric.

The thickness of the heat-insulating layer 3 is, for example, 0.1 mm or more, preferably 0.5 mm or more, and for example, 2 mm or less, preferably 1 mm or less.

<Method for Producing Laminated Product>

Figure 2A:
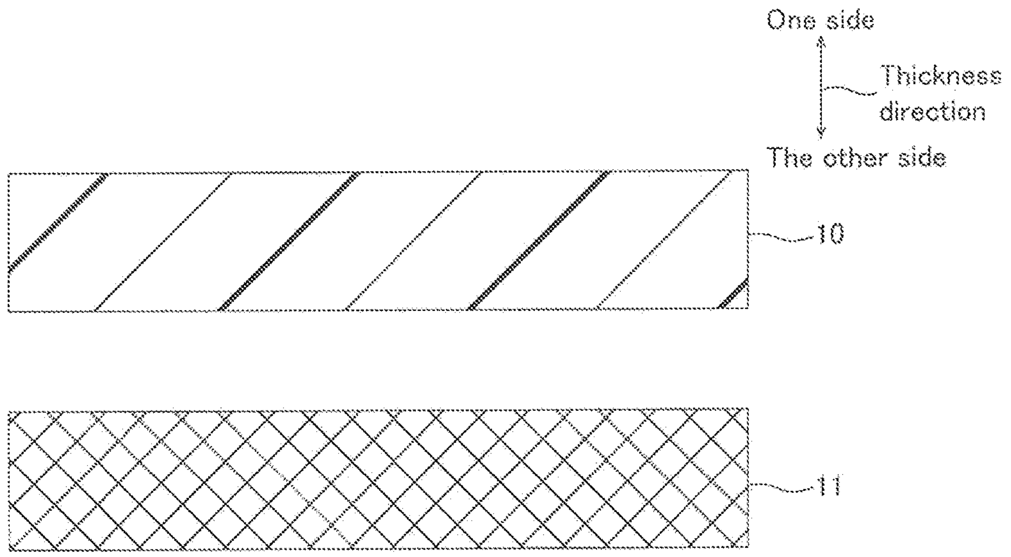
FIGS. 2A to 2C are schematic views showing an embodiment of a method for producing the laminated product in the first embodiment.
Figure 2B:
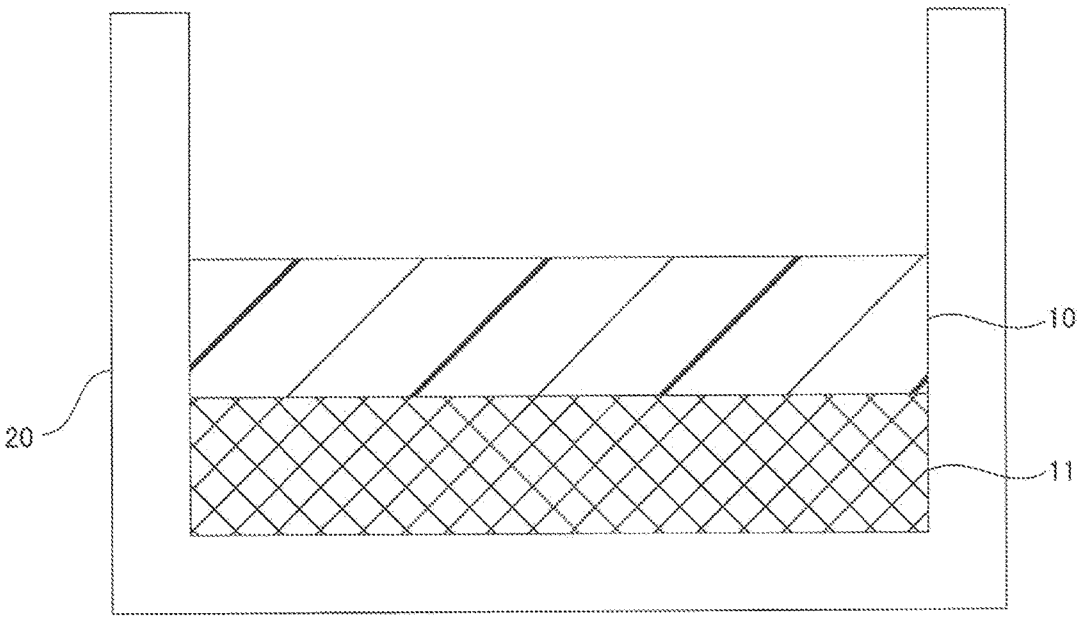
Figure 2C:
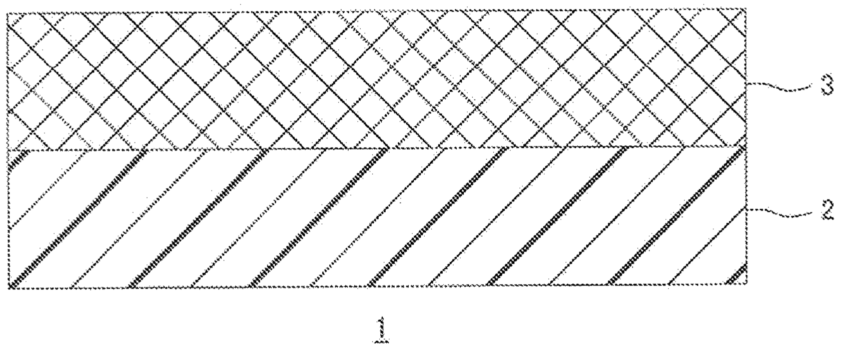

With reference to FIGS. 2A to 2C, a method for producing the laminated product 1 is described.

The method for producing the laminated product 1 (referred to also as first method) includes a first step of preparing a molding material 10 and a prepreg 11, and a second step of molding the molding material 10 together with the prepreg 11.

In the first step, as shown in FIG. 2A, the molding material 10 and the prepreg 11 are prepared.

In FIG. 2A, the molding material 10 is maintained in the form of a sheet.

To prepare the molding material 10, the reinforcing fiber and the first resin composition are blended. In detail, the first resin composition is impregnated with the reinforcing fiber.

Examples of the molding material 10 include a molding material produced by a known method, and include a sheet molding compound (SMC), a thick molding compound (TMC), and a bulk molding compound (BMC).

In this manner, the molding material 10 containing the reinforcing fiber and the first resin composition is produced.

Relative to the molding material 10, the total amount (volume content) of the filler-excluding component is, for example, 40% by volume or more, preferably 45% by volume or more, and for example, 70% by volume or less, preferably 60% by volume or less.

The filler-excluding component is the total amount of the components excluding the aluminum hydroxide, the expandable graphite, and the filler that is blended as necessary in the first resin composition. In other words, the filler-excluding component is the total amount of the first resin component, and the additives other than the filler that are blended as necessary.

Relative to the molding material 10, the volume content of the aluminum hydroxide is, for example, 10% by volume or more, preferably 20% by volume or more, and for example, 40% by volume or less.

Relative to the molding material 10, the volume content of the expandable graphite (calculated based on a density of 1.8 g/ml) is, for example, 1% by volume or more, and for example, 5% by volume or less, preferably 3% by volume or less (1% by weight or more, and for example, 5% by weight or less, preferably 3% by weight or less on the weight basis).

Relative to the molding material 10, the volume content of the reinforcing fiber is, for example, 15% by volume or more, preferably 20% by volume or more, and for example, 40% by volume or less, preferably 35% by volume or less.

Next, the molding material 10 described above is aged to increase the viscosity of the molding material 10 so that the molding material 10 is ready for heat compression molding (described later).

In the aging of the molding material 10, the aging temperature is, for example, 20 °C or more, and for example, 50 °C or less.
The aging time is, for example, 8 hours or more, and for example, 120 hours or less.

In this manner, the molding material 10 is maintained, for example, in the form of a sheet. That is, the molding material 10 has a sheet shape. In this manner, the molding material 10 is prepared The prepreg 11 is separately prepared.

To prepare the prepreg 11, the inorganic nonwoven fabric and the second resin composition are blended. In detail, the second resin composition is impregnated with the inorganic nonwoven fabric. After the impregnation, the prepreg 11 is aged at, for example, 20 °C or more and for example, 50 °C or less for, for example, 8 hours or more and for example, 120 hours or less, to increase the viscosity of the prepreg 11 so that the prepreg 11 is ready for heat compression molding (described later).

In this manner, the prepreg 11 is prepared.

In the second step, the molding material 10 is molded together with the prepreg 11. Specifically, the prepreg 11 is disposed at the bottom of a mold 20, and the molding material 10 is then disposed on one surface in the thickness direction of the prepreg 11.

The molding material 10 and the prepreg 11 are subjected to heat compression molding by a known method.

The conditions of the heat compression molding are appropriately set depending on the purpose and use. In the heat compression molding, the molding temperature is, for example, 100 °C or more, and for example, 200 °C or less. The molding pressure is, for example, 0.1 MPa or more, preferably 1 MPa or more, more preferably 5 MPa or more, and for example, 20 MPa or less, preferably 15 MPa or less.

Therefore, the molding material 10 and the prepreg 11 are cured in the second step. In this manner, the molded layer 2 and the heat-insulating layer 3 are simultaneously produced, thereby producing the laminated product 1 as shown in FIG. 2C.

According to the first method, an inorganic nonwoven fabric having a large unit weight can be integrally molded, which provides excellent fire resistance.

Second Embodiment

In the second embodiment, the same reference numerals are provided for members and steps corresponding to each of those in the first embodiment, and their detailed description is omitted. Further, the second embodiment can achieve the same function and effect as those of the first embodiment unless otherwise specified. Furthermore, the first embodiment, the second embodiment, and the modified examples thereof can be appropriately used in combination.

Figure 3:
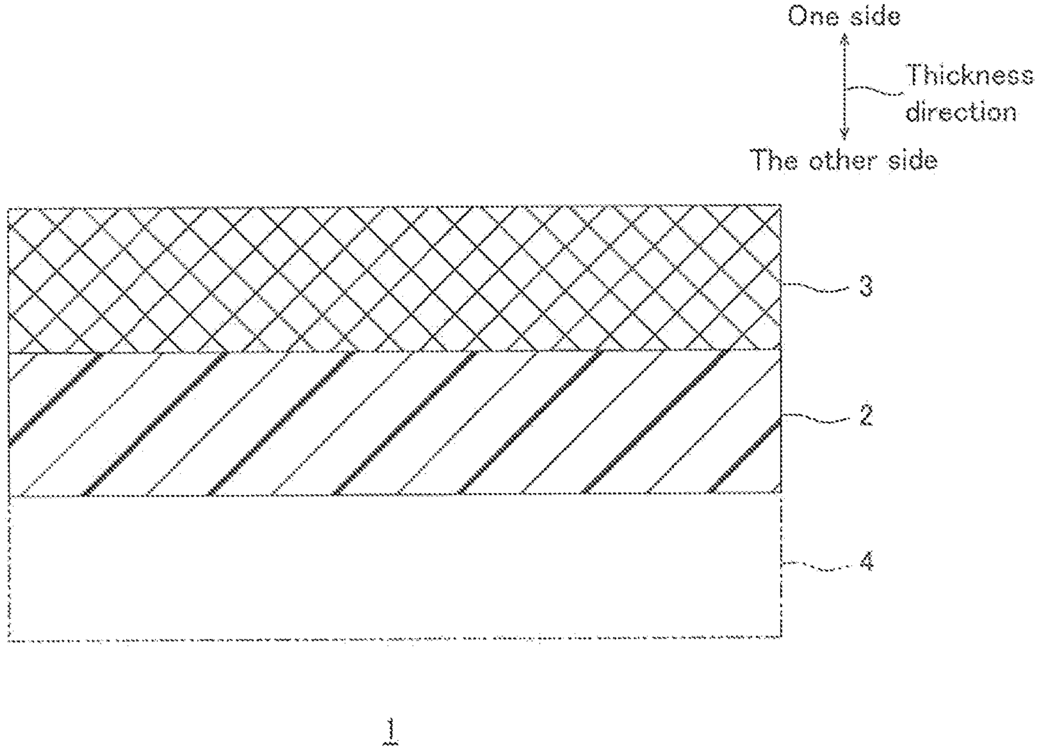
FIG. 3 is a schematic view showing a second embodiment of the laminated product according to the present invention.

With reference to FIG. 3, the second embodiment of the laminated product according to the present invention is described.

The laminated product 1 sequentially includes the molded layer 2 and the heat-insulating layer 3 toward one side in the thickness direction.

The molded layer 2 includes a cured product of a reinforcing fiber and the first resin composition. In detail, the molded layer 2 includes a cured product of a molding material containing a reinforcing fiber and the first resin composition.

The heat-insulating layer 3 includes a cured product of an inorganic nonwoven fabric and the second resin composition. In detail, the heat-insulating layer 3 includes a cured product of a prepreg containing an inorganic nonwoven fabric and the second resin composition.

On the other hand, in the second embodiment, the first resin composition and the second resin composition are identical.

As will be described later in detail, the second resin composition in the second embodiment is one in which a portion of the first resin composition contained in the molding material is impregnated with the inorganic nonwoven fabric in a fourth step to be described later.

<Method for Producing Laminated Product>

The method for producing the laminated product 1 (referred to also as second method) includes a third step of preparing the molding material 10 and an inorganic nonwoven fabric 12, and a fourth step of molding the molding material 10 and the inorganic nonwoven fabric 12.

Figure 4A:
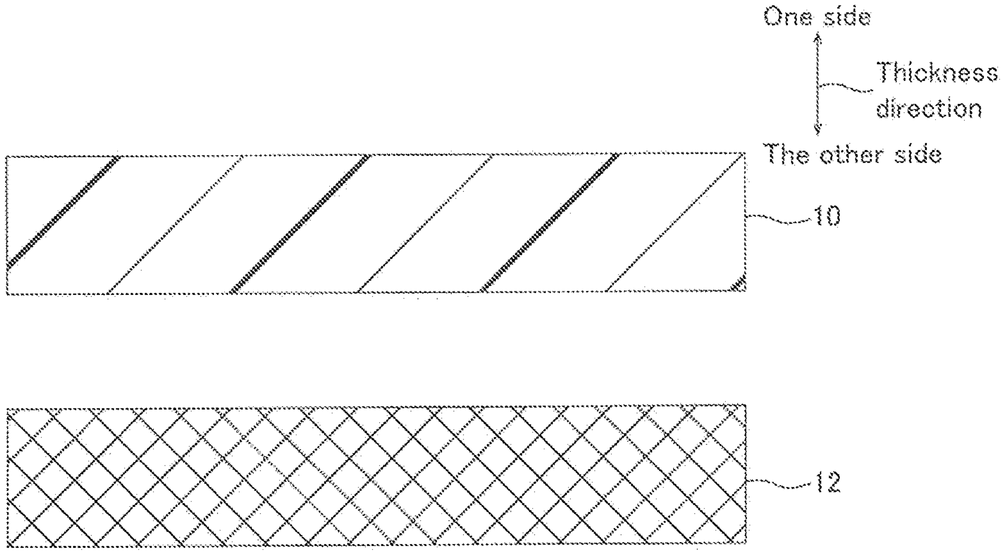
FIGS. 4A to 4C are schematic views showing an embodiment of the method for producing the laminated product in the second embodiment.
Figure 4B:
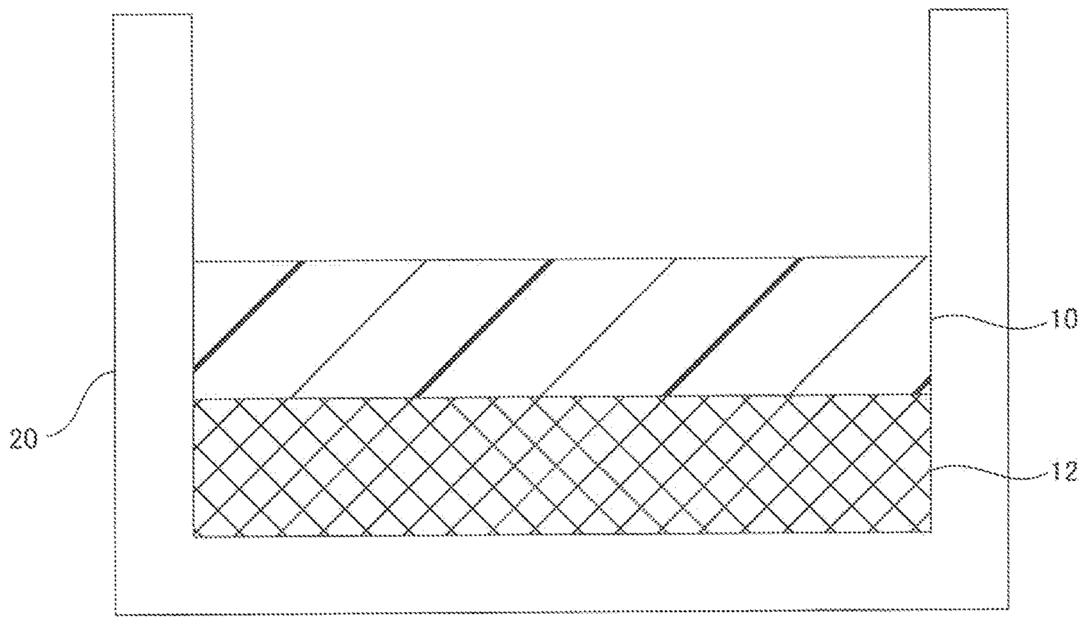

In the third step, as shown in FIG. 4A, the molding material 10 and the inorganic nonwoven fabric 12 are prepared. In FIG. 4A, the molding material 10 and the inorganic nonwoven fabric 12 are maintained in the form of a sheet.

The molding material 10 can be prepared in the same manner as in the above-described first method.

In the fourth step, the molding material 10 is molded. Specifically, the inorganic nonwoven fabric 12 is disposed at the bottom of the mold 20, and the molding material 10 is then disposed on one surface in the thickness direction of the inorganic nonwoven fabric 12.

The molding material 10 is subjected to heat compression molding by a known method.

The conditions for the heat compression molding are the same as those illustrated in the second step.

At this time, a portion of the first resin composition contained in the molding material 10 is impregnated with the inorganic nonwoven fabric 12. This first resin composition is then cured. In this manner, the heat-insulating layer 3 that includes the cured product of the inorganic nonwoven fabric and the second resin composition (first resin composition) is formed.

Figure 4C:
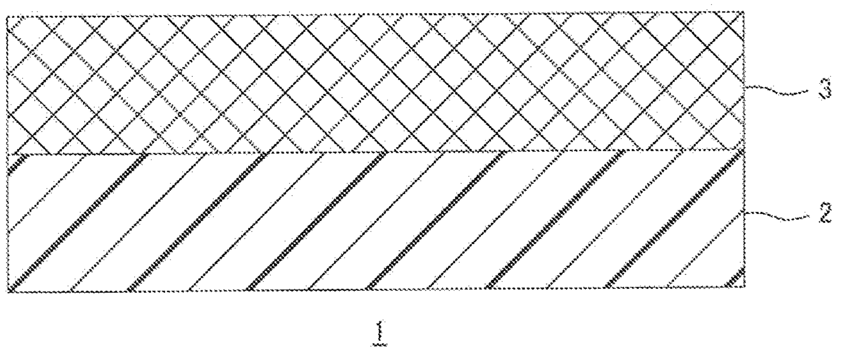

In this manner, as shown in FIG. 4C, the laminated product 1 is produced.

According to the second method, the prepreg 11 preparation step can be omitted.

<Function and Effect>

The laminated product 1 sequentially includes the molded layer 2 including aluminum hydroxide, and the heat-insulating layer 3 including an inorganic nonwoven fabric toward one side in the thickness direction. Therefore, the laminated product 1 has excellent flame retardancy.

In detail, since the molded layer 2 includes aluminum hydroxide, flame retardancy is improved, and since the heat-insulating layer 3 including the inorganic non-woven fabric contains inorganic fibers in a compressed form, combustion from the heat-insulating layer 3 side can be suppressed without increasing its plate thickness. Thus, the molded article 1 improves flame retardancy.

As described above, the heat-insulating layer 3 includes the inorganic nonwoven fabric. The inorganic fibers are randomly deposited and/or intertwined. When the heat-insulating layer 3 including such inorganic nonwoven fabric is exposed to flame, the inorganic fibers that have been compressed during molding expand (e.g., the inorganic fibers are deformed in a cotton shape and expand). This allows the heat-insulating layer 3 to exhibit a heat-insulating property. As a result, combustion from the heat-insulating layer 3 side can be suppressed.

The laminated product 1 can widely be used for building materials, housings, casting materials, machine components (such as battery cases for electric vehicles), electronic or electric components, and various components of vehicles, ships, and airplanes.

In particular, battery cases for electric vehicles may require excellent flame retardancy to retard the fire spread of a vehicle fire.

On the other hand, the laminated product 1 has excellent flame retardancy, and thus can suitably be used for battery cases for electric vehicles.

<Modified Example>

In the modified example, the same reference numerals are provided for members and steps corresponding to each of those in the first and second embodiments, and their detailed description is omitted. Further, the modified example can achieve the same function and effect as those of the first and second embodiments unless otherwise specified. Furthermore, the first embodiment, the second embodiment, and the modified examples thereof can be appropriately used in combination.

A second heat-insulating layer 4 (phantom lines in FIGS. 1 and 3) can be further provided on the other side in the thickness direction of the molded layer 2.

The second heat-insulating layer 4 has a sheet shape. The heat-insulating layer 3 is disposed on the other side in the thickness direction of the molded layer 2 so as to be in contact with the other surface in the thickness direction of the molded layer 2.

The second heat-insulating layer 4 includes a cured product of an inorganic fiber woven fabric and a third resin composition. In detail, the second heat-insulating layer 4 includes a cured product of a second heat-insulating layer prepreg containing the inorganic fiber woven fabric and the third resin composition.

The inorganic fiber woven fabric is inorganic fiber in the form of cloth. In detail, the inorganic fiber woven fabric is a woven fabric in which inorganic fibers are interwoven with each other. In detail, the inorganic fiber woven fabric is a woven fabric made of, for example, carbon fiber, glass strand, glass yarn, or roving woven in a plain weave, twill weave, or satin weave manner. That is, the inorganic fiber woven fabric is distinguished from the inorganic nonwoven fabric in which inorganic fibers are randomly deposited and/or intertwined.

Examples of the inorganic fiber include the same as the inorganic fibers illustrated for the heat-insulating layer 3.

As the third resin composition, the same composition as the first resin composition is used. Preferably, the third resin composition is identical to the first resin composition.

The third resin composition can be prepared in the same manner as the first resin composition.

Figure 5A:
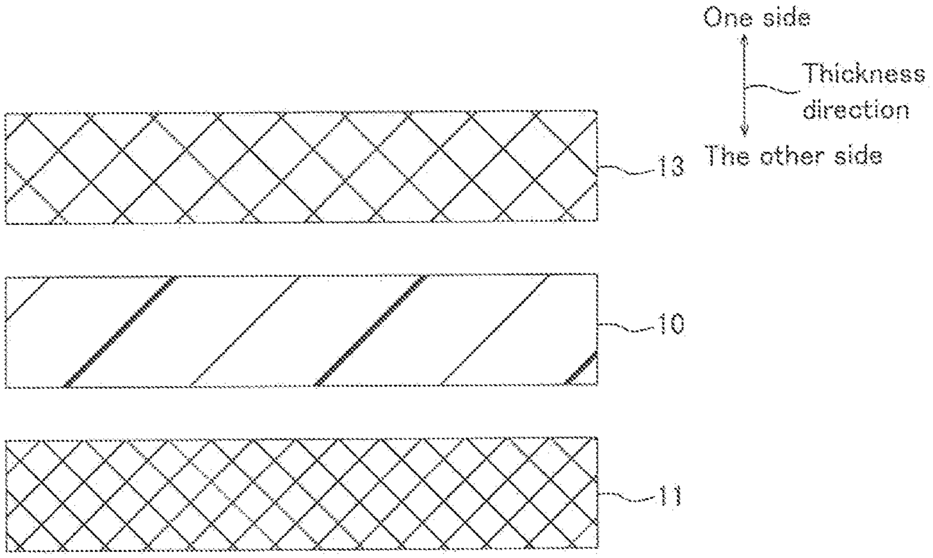
FIGS. 5A to 5C are schematic views showing an embodiment of the method for producing the laminated product provided with a second heat-insulating layer in the first embodiment.

To produce the laminated product 1 including the second heat-insulating layer 4 in the above-described first method, as shown in FIG. 5A, a second heat-insulating layer prepreg 13 is prepared together with the molding material 10 and the prepreg 11 in the above-described first step.

The second heat-insulating layer prepreg 13 is produced by blending the inorganic fiber woven fabric and the third resin composition. In detail, the third resin composition is impregnated with the inorganic fiber woven fabric. After the impregnation, the second heat-insulating layer prepreg 13 is aged at, for example, 20 °C or more and for example, 50 °C or less for, for example, 8 hours or more and for example, 120 hours or less, to increase the viscosity of the second heat-insulating layer prepreg 13 so that the second heat-insulating layer prepreg 13 is ready for heat compression molding. In this manner, the second heat-insulating layer prepreg 13 is prepared.

Figure 5B:
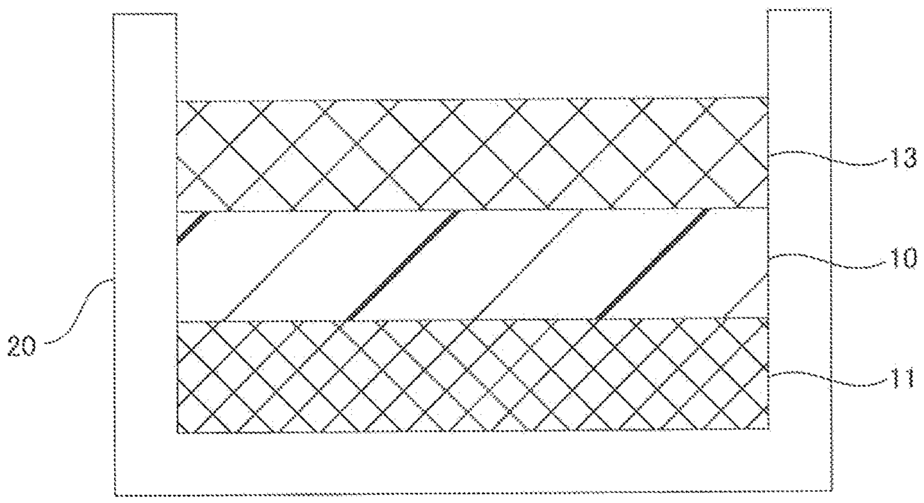

As shown in FIG. 5B, in the above-described second step, the molding material 10 is molded together with the prepreg 11 and the second heat insulation layer prepreg 13. Specifically, the prepreg 11 is disposed at the bottom of the mold 20, and the molding material 10 is then disposed on one surface in the thickness direction of the prepreg 11. Subsequently, the second heat-insulating layer prepreg 13 is disposed on one surface in the thickness direction of the molding material 10.

The molding material 10, the prepreg 11, and the second heat-insulating layer prepreg 13 are subjected to heat compression molding by a known method under the above-described conditions.

Figure 5C:
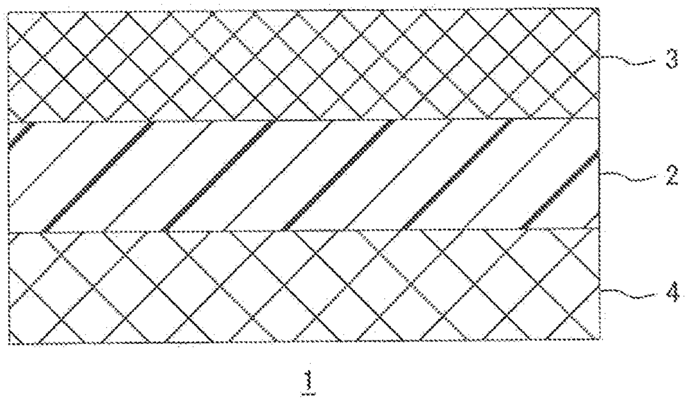

By doing so, the molding material 10, the prepreg 11, and the second heat-insulating layer prepreg 13 are cured. In this manner, the molded layer 2, the heat-insulating layer 3, and the second heat-insulating layer 4 are simultaneously produced, thereby producing the laminated product 1 as shown in FIG. 5C.

When the laminated product 1 including the second heat-insulating layer 4 is produced in the above-described first method, an inorganic fiber woven fabric 14 can be prepared together with the molding material 10 and the prepreg 11 in the first step.

In such a case, in the second step, the prepreg 11 is disposed at the bottom of the mold 20, and the molding material 10 is then disposed on one surface in the thickness direction of the prepreg 11. Subsequently, the inorganic fiber woven fabric 14 is disposed on one surface in the thickness direction of the molding material 10, and heat compression molding is then performed.

At this time, a portion of the first resin composition contained in the molding material 10 is impregnated with the inorganic fiber woven fabric 14. This first resin composition is then cured. In this manner, the second heat-insulating layer 4 that includes the cured product of the inorganic fiber woven fabric 14 and the third resin composition (first resin composition) is formed together with the heat-insulating layer 3.

Figure 6A:
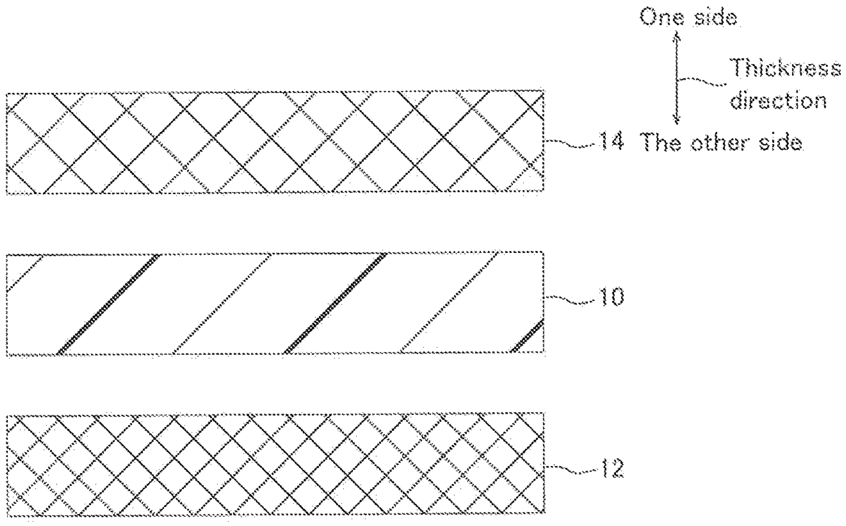
FIGS. 6A to 6C are schematic views showing an embodiment of the method for producing the laminated product provided with the second heat-insulating layer in the second embodiment.

To produce the laminated product 1 including the second heat-insulating layer 4 in the above-described second method, as shown in FIG. 6A, the inorganic fiber woven fabric 14 is prepared together with the molding material 10 and the inorganic nonwoven fabric 12 in the third step.

Figure 6B:
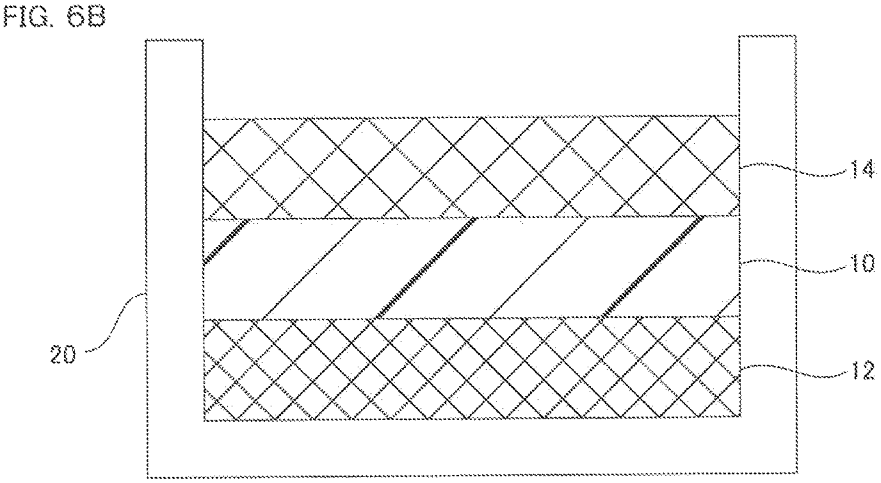

As shown in FIG. 6B, in the fourth step, the molding material 10 is molded. Specifically, the inorganic nonwoven fabric 12 is disposed at the bottom of the mold 20, and the molding material 10 is then disposed on one surface in the thickness direction of the inorganic nonwoven fabric 12. Subsequently, the inorganic fiber woven fabric 14 is disposed on one surface in the thickness direction of the molding material 10.

The molding material 10 is subjected to heat compression molding by a known method under the above-described conditions.

At this time, a portion of the first resin composition contained in the molding material 10 is impregnated with the inorganic nonwoven fabric 12 and is also impregnated with the inorganic fiber woven fabric 14. This first resin composition is then cured. In this manner, the second heat-insulating layer 4 that includes the cured product of the inorganic fiber woven fabric 14 and the third resin composition (first resin composition) is formed together with the heat-insulating layer 3.

Figure 6C:
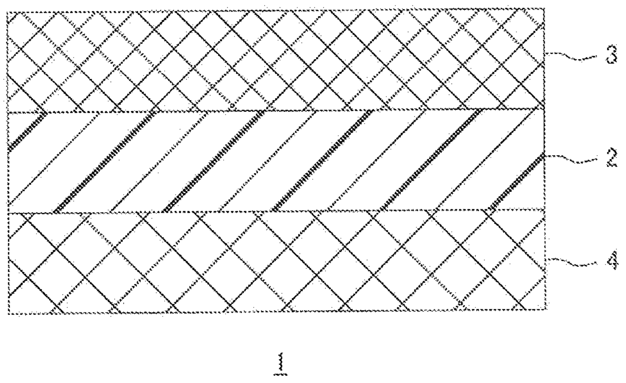

In this manner, as shown in FIG. 6C, the laminated product 1 is produced.

When the laminate 1 including the second heat-insulating layer 4 is produced in the above-described second method, the second heat-insulating layer prepreg 13 can be prepared together with the molding material 10 and the inorganic nonwoven fabric 12 in the third step.

In such a case as well, the molding material 10 and the second heat-insulating layer prepreg 13 are cured in the same manner as the above-described procedure.

When the laminated product 1 includes the second heat-insulating layer 4, the heat-insulating property of the laminated product 1 after combustion is improved and its strength is increased.

The thickness of the second heat-insulating layer 4 is, for example, 0.03 mm or more, and for example, 5 mm or less.

In the above description, the laminated product 1 of the second embodiment is produced by the first method. However, it can be produced by the second method in which the second resin composition is changed to the first resin composition.

EXAMPLE

The specific numerical values in mixing ratio (content ratio), property value, and parameter used in the following description can be replaced with upper limit values (numerical values defined as "or less" or "below") or lower limit values (numerical values defined as "or more" or "above") of corresponding numerical values in mixing ratio (content ratio), property value, and parameter described in the above-described "DESCRIPTION OF THE EMBODIMENTS". The "parts" and "%" are based on mass unless otherwise specified in the following description.

1. Details of Components

- Expandable graphite (an average particle size of 70 μm): The trade name "9510045" manufactured by Ito Graphite Co., Ltd was used without any change (25% on 100 mesh).
- OP 1230: Flame retardant, a phosphinic acid metal salt, trade name "Exolit OP1230" manufactured by Clariant Chemicals.
- MC-4000: Flame retardant (nitrogen compound-based flame retardant), manufactured by Nissan Chemical Corporation
- SB-140: Glass fiber paper, a basis weight of 140 g/m$^2$, manufactured by ORIBEST Co., Ltd.
- CFZ-100RD: Carbon fiber paper, a basis weight of 100 g/m$^2$, manufactured by Nippon Polymer Sangyo Co., Ltd.
- CFZ-500SD: Carbon fiber felt, a basis weight of 500 g/m$^2$, manufactured by Nippon Polymer Sangyo Co., Ltd.
- MNA-600-1000: Glass fiber felt (heat-resistant glass felt), glass needle mat MNA-600-1000-30m, a basis weight of 600 g/m$^2$, manufactured by Nihon Glass Fiber Industrial Co., Ltd.
- M100K 104H: Glass cloth, a mass of 105 g/m$^2$, manufactured by Unitika Ltd.
- M205K 104H: Glass cloth, a mass of 200 g/m$^2$, manufactured by Unitika Ltd.

2. Preparation of Unsaturated Polyester Resin

Synthesis Example 1

A flask equipped with a thermometer, a nitrogen introducing tube, a reflux tube, and a stirrer was charged with 10.0 mol of maleic anhydride, 6.5 mol of propylene glycol, and 4.0 mol of neopentyl glycol. Thereafter, the mixture was subjected to polycondensation reaction at 200 °C to 210 °C while being stirred under nitrogen gas atmosphere. In this manner, an unsaturated polyester with an acid value of 26.5 mg KOH/g was produced. The acid value was measured by a method in conformity with JIS K6901 (2008). Next, relative to 100 parts by mass of the produced unsaturated polyester, 0.01 parts by mass of hydroquinone as a polymerization inhibitor and 66.7 parts by mass of styrene were added, and the mixture was stirred homogenously. In this manner, an unsaturated polyester resin (styrene content 40% by mass) was produced.

3. Preparation of Vinyl Ester Resin

Synthesis Example 2

A flask equipped with a stirrer, a reflux tube, and a gas introducing tube was charged with 1850 parts by mass of a bisphenol A epoxy compound (epoxy equivalent of 185 g/eq) (10.0 equivalents), 317 parts by mass of bisphenol A (2.78 equivalents), and 1.0 part by mass of triethylbenzylammonium chloride as a catalyst. Next, the mixture was allowed to react at 170 °C for 5 hours while nitrogen was introduced. In this manner, an epoxy resin with an epoxy equivalent of 298 g/eq was produced. After the mixture was cooled to 120 °C, 1.0 part by mass of hydroquinone as a polymerization inhibitor, 5.0 parts by mass of triethylbenzylammonium chloride as a catalyst, and 636 parts by mass of methacrylic acid (7.40 equivalents) were added. Next, the mixture was allowed to react at 110 °C for 8 hours while the air was introduced. In this manner, a vinyl ester with an acid value of 8.0 mg KOH/g was produced. Next, 1869 parts by mass of styrene (66.7 parts by mass to 100 parts by mass of the vinyl ester) was added to the produced vinyl ester. In this manner, a vinyl ester resin (styrene content of 40% by mass) was produced.

4. Production of Laminated Product

Example 1 (First Method)

<First Step>

The following components were added in the order in which they appear and mixed. In this manner, a first resin composition was produced.

- Unsaturated polyester resin: 60 parts by mass of the unsaturated polyester resin of Synthesis Example 1 (36 parts by mass of unsaturated polyester, 24 parts by mass of styrene)
- Vinyl ester resin: 10 parts by mass of the vinyl ester resin of Synthesis Example 2 (6 parts by mass of vinyl ester, 4 parts by mass of styrene)
- Polymerizable monomer: 10 parts by mass of styrene
- Low profile agent: 15 parts by mass of a polystyrene solution (a styrene solution of polystyrene (a weight average molecular weight of approximately 200000) (styrene content of 65%)), and 5 parts by mass of polyethylene powder
- Aluminum hydroxide: 150 parts by mass of aluminum hydroxide (an average particle size of 8 μm)

Polymerization inhibitor: 0.05 parts by mass of p-benzoquinone

Curing agent: 1 part by mass of t-butyl peroxyisopropyl carbonate

Release agent: 5 parts by mass of zinc stearate

Coloring agent: 10 parts by mass of black polyester toner (produced by dispersing carbon black in polyester resin)

Wetting and dispersing agent: 1.0 part by mass of a copolymer having an acid group and 0.5 parts by mass of an alkylammonium salt of a high-molecular weight polymer Thickening agent: 0.8 parts by mass of magnesium oxide Next, glass roving was continuously cut into 25-mm pieces on the first resin composition applied on a carrier film using a known sheet molding compound (SMC) impregnation device and a doctor blade, and the resulting chopped strand was (dispersed in an undirected manner in the form of a sheet) added to the first resin composition so that the glass fiber content became 35% by mass (25.5% by volume). Subsequently, an impregnating step was carried out, and thus, a molding material (sheet molding compound (SMC)) was produced. Next, this molding material was aged at 40 °C for 48 hours to increase the viscosity of the molding material until the molding material was ready for heat compression molding. Thereby, a molding material was produced.

Separately, the following components were added in the order in which they appear and mixed. In this manner, a second resin composition was produced.

Unsaturated polyester resin: 60 parts by mass of the unsaturated polyester resin of Synthesis Example 1 (36 parts by mass of unsaturated polyester, 24 parts by mass of styrene)

Vinyl ester resin: 10 parts by mass of the vinyl ester resin of Synthesis Example 2 (6 parts by mass of vinyl ester, 4 parts by mass of styrene)

Polymerizable monomer: 10 parts by mass of styrene

Low profile agent: 15 parts by mass of a polystyrene solution (a styrene solution of polystyrene (a weight average molecular weight of approximately 200000) (styrene content of 65%)), and 5 parts by mass of polyethylene powder Aluminum hydroxide: 40 parts by mass of aluminum hydroxide (an average particle size of 8 μm)

Polymerization inhibitor: 0.05 parts by mass of p-benzoquinone

Curing agent: 1 part by mass of t-butyl peroxyisopropyl carbonate

Release agent: 5 parts by mass of zinc stearate

Coloring agent: 10 parts by mass of black polyester toner (produced by dispersing carbon black in polyester resin)

Wetting and dispersing agent: 1.0 part by mass of a copolymer having an acid group and 0.5 parts by mass of an alkylammonium salt of a high-molecular weight polymer Thickening agent: 0.8 parts by mass of magnesium oxide Next, CFZ-500SD was added onto the second resin composition applied on a carrier film using a known sheet molding compound (SMC) impregnation device and a doctor blade. Subsequently, an impregnating step was carried out, and thus, a prepreg (sheet molding compound (SMC)) was produced. Next, this prepreg was aged at 40 °C for 48 hours to increase the viscosity of the prepreg until the molding material was ready for heat compression molding. Thereby, a prepreg was produced.

<Second Step>

The molding material and prepreg of which the weights were adjusted were simultaneously subjected to heat compression molding using a 300 mm×300 mm flat metal plate, thereby producing a board-shaped laminated product having a thickness of 2.5 mm.

The molding was carried out under the conditions of a mold temperature on the product side and the reverse side of 140 °C, a mold pressure of 10 MPa, and a retaining time inside the mold of 300 seconds. The prepreg was disposed at the bottom surface of the mold.

After being demolded from the mold, the laminated product was immediately held between the iron plates and cooled.

Examples 2 to 6 (First Method)

The same process as Example 1 was carried out, thereby producing laminated products.

The formulations were, however, changed according to Tables 1 to 4.

Examples 7 and 8 (Second Method)

<Third Step>

The same process as Example 1 was carried out, thereby producing molding materials. The formulations were, however, changed according to Tables 2 and 4. An inorganic nonwoven fabric was separately prepared.

<Fourth Step>

The molding material and inorganic nonwoven fabric of which the weights were adjusted were simultaneously subjected to heat compression molding using a 300 mm×300 mm flat metal plate, thereby producing a board-shaped laminated product having a thickness of 2.5 mm to 3 mm.

The molding was carried out under the conditions of a mold temperature on the product side and the reverse side of 140 °C, a mold pressure of 10 MPa, and a retaining time inside the mold of 300 seconds. The inorganic nonwoven fabric was disposed at the bottom surface of the mold.

After being demolded from the mold, the laminated product was immediately held between the iron plates and cooled.

Examples 9 and 10

The same process as Example 1 was carried out, thereby producing laminated products. The formulations were, however, changed according to Tables 2 and 4.

In Example 9, an inorganic fiber woven fabric was prepared together with the molding material and the prepreg in the third step. In the fourth step, the prepreg was disposed at the bottom of the mold, and the molding material was then disposed on one surface in the thickness direction of the prepreg. Subsequently, the inorganic fiber woven fabric was disposed on one surface in the thickness direction of the molding material, and the molding material was then cured based on the same procedure as that in Example 1. In this manner, a laminated product including a second heat-insulating layer was produced.

In Example 10, a third resin composition was prepared according to the formulation described in Table 5, together with the molding material and the prepreg in the first step. In the same manner as in Example 1, a second heat-insulating layer prepreg was prepared from the third resin composition.

In the second step, the molding material was molded together with the prepreg and the second heat-insulating layer prepreg.

Specifically, the prepreg was disposed at the bottom of the mold, and the molding material was then disposed on one surface in the thickness direction of the prepreg. Subsequently, the second heat-insulating layer prepreg was disposed on one surface in the thickness direction of the molding material.

The molding material, the prepreg, and the second heat-insulating layer prepreg were subjected to heat compression molding by the same procedure as that in Example 1. In this manner, a laminated product including a second heat-insulating layer was produced.

Comparative Examples 1 to 3

The same process as Example 1 was carried out, thereby producing molding materials. The formulations were, however, changed according to Tables 1 to 4.

Next, the molding material of which the weight was adjusted was simultaneously subjected to heat compression molding using a 300 mm×300 mm flat metal plate, thereby producing a board-shaped laminated product having a thickness of 2 to 3 mm.

The molding was carried out under the conditions of a mold temperature on the product side and the reverse side of 140 °C, a mold pressure of 10 MPa, and a retaining time inside the mold of 300 seconds.

After being demolded from the mold, the laminated product was immediately held between the iron plates and cooled.

5. Evaluation

<Flammability Test>

(Highest Temperature of the Reverse Side of Test Piece During Flame Radiation)

A test piece (150 mm×150 mm) was cut out from each of the laminated products of Examples and Comparative Examples. Next, a commercially available cooking torch (culinary torch CJ2 manufactured by Iwatani Corporation) was used and adjusted so that the length of the inner cone of the flame of the torch was approximately 50 mm, and the temperature of the tip of the inner cone was approximately 1000 °C. Further, the central part of the 150 mm×150 mm test piece was fixed to a position vertically 40 mm away from the tip of the torch. Further, the test piece was fixed so that the center of the reverse side of the test piece could be measured with an infrared thermometer. The torch was ignited, the flame was radiated while measuring the temperature of the test piece, and stopped after 5 minutes. The highest temperature of the reverse side of the test piece when the flame was radiated are shown in Tables 2 and 4.

(Strength after Fire Extinguishing)

After the fire was extinguished, the test piece was cooled to room temperature and then pressed with a finger to evaluate its strength based on the following criteria. The results are shown in Tables 2 and 4.

[Evaluation Criteria]

Good: The test piece was not broken.

Bad: The test piece was broken.

(Expansion of Heat-Insulating Layer)

The presence or absence of expansion of the heat-insulating layer was observed. The results are shown in Tables 2 and 4.

[Evaluation Criteria]

Good: A swelling of about 1 mm was observed compared to the test piece before flame radiation.

Bad: No swelling was observed.

(Flexural Strength after Combustion)

After the fire was extinguished, the laminated products of Examples 9 and 10 were cooled to room temperature, and a test piece with a width of 25 mm was cut out from each of the laminated products. The flexure strength was measured in conformity with JIS K7074 (1988). The results are shown in Table 4.

TABLE 1

| | | Example No. and Comparative Example No. | | | Ex. 1 | Ex. 2 | Ex. 3 | Ex. 4 | Comp. Ex. 1 | Comp. Ex. 2 |
|---|---|---|---|---|---|---|---|---|---|---|
| | | Method for producing laminated product | | | First method | First method | First method | First method | — | — |
| Molded layer | First resin composition | Unsaturated polyester resin | Unsaturated polyester resin of Synthesis Example 1 | Parts by mass | 60 | 60 | 60 | 60 | 60 | 60 |
| | | Vinyl ester resin | Vinyl ester resin of Synthesis Example 2 | Parts by mass | 10 | 10 | 10 | 10 | 10 | 10 |
| | | Polymerizable monomer | Styrene | Parts by mass | 10 | 10 | 10 | 10 | 10 | 10 |
| | | Low profile agent | Polystyrene solution | Parts by mass | 15 | 15 | 15 | 15 | 15 | 15 |
| | | | Polyethylene powder | Parts by mass | 5 | 5 | 5 | 5 | 5 | 5 |
| | | Aluminum hydroxide | | Parts by mass | 150 | 40 | 150 | 40 | 150 | 250 |
| | | Flame retardant | OP1230 | Parts by mass | — | — | — | — | — | 15 |
| | | | MC-4000 | Parts by mass | | | | | | |
| | | Expandable graphite | | Parts by mass | — | — | — | — | — | — |
| | | Polymerization inhibitor | p-Benzoquinone | Parts by mass | 0.05 | 0.05 | 0.05 | 0.05 | 0.05 | 0.05 |
| | | Curing agent | t-butyl peroxyisopropyl carbonate | Parts by mass | 1 | 1 | 1 | 1 | 1 | 1 |
| | | Release agent | Zinc stearate | Parts by mass | 5 | 5 | 5 | 5 | 5 | 5 |
| | | Coloring agent | Black polyester toner | Parts by mass | 10 | 10 | 10 | 10 | 10 | 10 |
| | | Wetting and dispersing agent | Copolymer having an acid group | Parts by mass | 1.0 | 1.0 | 1.0 | 1.0 | 1.0 | 1.0 |
| | | | Alkylammonium salt of high-molecular weight copolymer | Parts by mass | 0.5 | 0.5 | 0.5 | 0.5 | 0.5 | 0.5 |
| | | Thickening agent | Magnesium oxide | Parts by mass | 0.8 | 0.8 | 0.8 | 0.8 | 0.8 | 0.8 |

TABLE 1-continued

| Example No. and Comparative Example No. | | | Ex. 1 | Ex. 2 | Ex. 3 | Ex. 4 | Comp. Ex. 1 | Comp. Ex. 2 |
|---|---|---|---|---|---|---|---|---|
| Reinforcing fiber | Glass fiber | % | 30 | 32 | 30 | 32 | 30 | 29 |
| Volume content to first molding material | Filler-excluding component | vol. % | 50.2 | 68.4 | 50.2 | 68.4 | 50.2 | 46.8 |
| | Aluminum hydroxide | vol. % | 28.8 | 11.4 | 28.8 | 11.4 | 28.8 | 33.3 |
| | Expandable graphite | vol. % | 0 | 0 | 0 | 0 | 0 | 0 |
| | Glass fiber | vol. % | 21 | 20.2 | 21 | 20.2 | 21 | 19.9 |
| | Total | vol. % | 100 | 100 | 100 | 100 | 100 | 100 |
| Thickness of cured product of molding material | | mm | 1.7 | 1.7 | 1.9 | 1.9 | 2.5 | 3 |

TABLE 2

| Example No. and Comparative Example No. | | | | | Ex. 5 | Ex. 6 | Ex. 7 | Ex. 8 |
|---|---|---|---|---|---|---|---|---|
| Method for producing laminated product | | | | | First method | First method | Second method | Second method |
| Molded layer | First resin composition | Unsaturated polyester resin | Unsaturated polyester resin of Synthesis Example 1 | Parts by mass | 60 | 60 | 60 | 60 |
| | | Vinyl ester resin | Vinyl ester resin of Synthesis Example 2 | Parts by mass | 10 | 10 | 10 | 10 |
| | | Polymerizable monomer | Styrene | Parts by mass | 10 | 10 | 10 | 10 |
| | | Low profile agent | Polystyrene solution | Parts by mass | 15 | 15 | 15 | 15 |
| | | | Polyethylene powder | Parts by mass | 5 | 5 | 5 | 5 |
| | | Aluminum hydroxide | | Parts by mass | 150 | 150 | 40 | 40 |
| | | Flame retardant | OP1230 | Parts by mass | — | — | — | — |
| | | | MC-4000 | Parts by mass | | | | |
| | | Expandable graphite | | Parts by mass | — | — | 7 | 7 |
| | | Polymerization inhibitor | p-Benzoquinone | Parts by mass | 0.05 | 0.05 | 0.05 | 0.05 |
| | | Curing agent | t-butyl peroxyisopropyl carbonate | Parts by mass | 1 | 1 | 1 | 1 |
| | | Release agent | Zinc stearate | Parts by mass | 5 | 5 | 5 | 5 |
| | | Coloring agent | Black polyester toner | Parts by mass | 10 | 10 | 10 | 10 |
| | | Wetting and dispersing agent | Copolymer having an acid group | Parts by mass | 1.0 | 1.0 | 1.0 | 1.0 |
| | | | Alkylammonium salt of high-molecular weight copolymer | Parts by mass | 0.5 | 0.5 | 0.5 | 0.5 |
| | | Thickening agent | Magnesium oxide | Parts by mass | 0.8 | 0.8 | 0.8 | 0.8 |
| | | Reinforcing fiber | Glass fiber | % | 30 | 30 | 34 | 34 |
| | | Volume content to first molding material | Filler-excluding component | vol. % | 50.2 | 50.2 | 65.5 | 65.5 |
| | | | Aluminum hydroxide | vol. % | 28.8 | 28.8 | 10.6 | 10.6 |
| | | | Expandable graphite | vol. % | 0 | 0 | 2.5 | 2.5 |
| | | | Glass fiber | vol. % | 21 | 21 | 21.4 | 21.4 |
| | | | Total | vol. % | 100 | 100 | 100 | 100 |
| | | Thickness of cured product of molding material | | mm | 2 | 2 | 1.95 | 1.95 |

| Example No. and Comparative Example No. | | | | | Comp. Ex. 3 | Ex. 9 | Ex. 10 |
|---|---|---|---|---|---|---|---|
| Method for producing laminated product | | | | | — | First method | First method |
| Molded layer | First resin composition | Unsaturated polyester resin | Unsaturated polyester resin of Synthesis Example 1 | Parts by mass | 60 | 60 | 60 |
| | | Vinyl ester resin | Vinyl ester resin of Synthesis Example 2 | Parts by mass | 10 | 10 | 10 |
| | | Polymerizable monomer | Styrene | Parts by mass | 10 | 10 | 10 |
| | | Low profile agent | Polystyrene solution | Parts by mass | 15 | 15 | 15 |
| | | | Polyethylene powder | Parts by mass | 5 | 5 | 5 |
| | | Aluminum hydroxide | | Parts by mass | 40 | 120 | 120 |
| | | Flame retardant | OP1230 | Parts by mass | — | 10 | 10 |
| | | | MC-4000 | Parts by mass | | 10 | 10 |
| | | Expandable graphite | | Parts by mass | 7 | — | — |
| | | Polymerization inhibitor | t-butyl peroxyisopropyl carbonate | Parts by mass | 0.05 | 0.05 | 0.05 |
| | | Curing agent | t-butyl peroxyisopropyl carbonate | Parts by mass | 1 | 1 | 1 |
| | | Release agent | Zinc stearate | Parts by mass | 5 | 5 | 5 |
| | | Coloring agent | Black polyester toner | Parts by mass | 10 | 10 | 10 |
| | | Wetting and dispersing agent | Copolymer having an acid group | Parts by mass | 1.0 | 1.0 | 1.0 |
| | | | Alkylammonium salt of high-molecular weight copolymer | Parts by mass | 0.5 | 0.5 | 0.5 |

TABLE 2-continued

| | | | | | |
|---|---|---|---|---|---|
| Thickening agent | Magnesium oxide | Parts by mass | 0.8 | 0.8 | 0.8 |
| Reinforcing fiber | Glass fiber | % | 34 | 35 | 35 |
| Volume content to first molding material | Filler-excluding component | vol. % | 65.5 | 48.3 | 48.3 |
| | Aluminum hydroxide | vol. % | 10.6 | 22.1 | 22.1 |
| | Expandable graphite | vol. % | 2.5 | 0 | 0 |
| | Glass fiber | vol. % | 21.4 | 23.3 | 23.3 |
| | Total | vol. % | 100 | 100 | 100 |
| Thickness of cured product of molding material | | mm | 2 | 1.7 | 1.7 |

TABLE 3

| Example No. and Comparative Example No. | | | | | Ex. 1 | Ex. 2 | Ex. 3 | Ex. 4 | Comp. Ex. 1 | Comp. Ex. 2 |
|---|---|---|---|---|---|---|---|---|---|---|
| Heat-insulating layer | Second resin composition | Unsaturated polyester resin | Unsaturated polyester resin of Synthesis Example 1 | Parts by mass | 60 | 60 | 60 | 60 | — | — |
| | | Vinyl ester resin | Vinyl ester resin of Synthesis Example 2 | Parts by mass | 10 | 10 | 10 | 10 | — | — |
| | | Polymerizable monomer | Styrene | Parts by mass | 10 | 10 | 10 | 10 | — | — |
| | | Low profile agent | Polystyrene solution | Parts by mass | 15 | 15 | 15 | 15 | — | — |
| | | | Polyethylene powder | Parts by mass | 5 | 5 | 5 | 5 | — | — |
| | | Aluminum hydroxide | | Parts by mass | 40 | 40 | 40 | 40 | — | — |
| | | Flame retardant | OP1230 | Parts by mass | — | — | — | — | — | — |
| | | | MC-4000 | Parts by mass | | | | | — | — |
| | | Expandable graphite | | Parts by mass | — | — | — | — | — | — |
| | | Polymerization inhibitor | p-benzoquinone | Parts by mass | 0.05 | 0.05 | 0.05 | 0.05 | — | — |
| | | Curing agent | t-butyl peroxyisopropyl carbonate | Parts by mass | 1 | 1 | 1 | 1 | — | — |
| | | | t-butyl peroxybenzoate | Parts by mass | — | — | — | — | — | — |
| | | Release agent | Zinc stearate | Parts by mass | 5 | 5 | 5 | 5 | — | — |
| | | Coloring agent | Black polyester toner | Parts by mass | 10 | 10 | 10 | 10 | — | — |
| | | Wetting and dispersing agent | Copolymer having an acid group | Parts by mass | 1.0 | 1.0 | 1.0 | 1.0 | — | — |
| | | | Alkylammonium salt of high-molecular weight copolymer | Parts by mass | 0.5 | 0.5 | 0.5 | 0.5 | — | — |
| | | | Phosphoric acid polyester | Parts by mass | — | — | — | — | — | — |
| | | Thickening agent | Magnesium oxide | Parts by mass | 0.8 | 0.8 | 0.8 | 0.8 | — | — |
| | | Thickness | | mm | 0.5 | 0.5 | 0.5 | 0.5 | — | — |
| | Inorganic nonwoven fabric | SB-140 | Glass fiber paper | — | — | — | — | — | — | — |
| | | CFZ-100RD | Carbon fiber paper | — | — | — | — | — | — | — |
| | | CFZ-500SD | Carbon fiber felt | — | ○ | ○ | — | — | — | — |
| | | MNA-600-100 | Glass fiber felt | — | — | — | ○ | ○ | — | — |
| | Thickness of inorganic fiber | | | mm | 0.3 | 0.3 | 0.1 | 0.1 | — | — |
| | Thickness of heat-insulating layer | | | mm | 0.8 | 0.8 | 0.6 | 0.6 | — | — |
| Evaluation | Highest temperature of the reverse side of test piece during flame radiation | | | | 400 °C or less | 400 °C or less | 400 °C or less | 400 °C or less | 600 °C or more | 600 °C or more |
| | Strength after fire extinguishing | | | | Good | Good | Good | Good | Bad | Bad |
| | Expansion of heat-insulating layer | | | | Good | Good | Good | Good | Bad | Bad |
| | Flexural strength after combustion (N) | | | | — | — | — | — | — | — |

TABLE 4

| Example No. and Comparative Example No. | | | | | Ex. 5 | Ex. 6 | Ex. 7 | Bx. 8 |
|---|---|---|---|---|---|---|---|---|
| Heat-insulating layer | Second resin composition | Unsaturated polyester resin | Unsaturated polyester resin of Synthesis Example 1 | Parts by mass | 60 | 60 | — | — |
| | | Vinyl ester resin | Vinyl ester resin of Synthesis Example 2 | Parts by mass | 10 | 10 | — | — |
| | | Polymerizable monomer | Styrene | Parts by mass | 10 | 10 | — | — |
| | | Low profile agent | Polystyrene solution | Parts by mass | 15 | 15 | — | — |
| | | | Polyethylene powder | Parts by mass | 5 | 5 | — | — |
| | | Aluminum hydroxide | | Parts by mass | 40 | 40 | — | — |
| | | Flame retardant | OP1230 | Parts by mass | — | — | — | — |
| | | | MC-4000 | Parts by mass | | | — | — |
| | | Expandable graphite | | Parts by mass | 7 | 7 | — | — |
| | | Polymerization inhibitor | p-benzoquinone | Parts by mass | 0.05 | 0.05 | — | — |
| | | Curing agent | t-butyl peroxyisopropyl carbonate | Parts by mass | 1 | 1 | — | — |
| | | | t-butyl peroxybenzoate | Parts by mass | — | — | — | — |
| | | Release agent | Zinc stearate | Parts by mass | 5 | 5 | — | — |
| | | Coloring agent | Black polyester toner | Parts by mass | 10 | 10 | — | — |

TABLE 4-continued

| | | | | | | | | |
|---|---|---|---|---|---|---|---|---|
| | | Wetting and dispersing agent | Copolymer having an acid group | Parts by mass | 1.0 | 1.0 | — | — |
| | | | Alkylammonium salt of high-molecular weight copolymer | Parts by mass | 0.5 | 0.5 | — | — |
| | | | Phosphoric acid polyester | Parts by mass | — | — | — | — |
| | | Thickening agent | Magnesium oxide | Parts by mass | 0.8 | 0.8 | — | — |
| | | Thickness | | mm | 0.5 | 0.5 | — | — |
| | Inorganic nonwoven fabric | SB-140 | Glass fiber paper | — | Good | — | Good | — |
| | | CFZ-100RD | Carbon fiber paper | — | — | Good | — | Good |
| | | CFZ-500SD | Carbon fiber felt | — | — | — | — | — |
| | | MNA-600-100 | Glass fiber felt | — | — | — | — | — |
| | | Thickness of inorganic fiber | | mm | 0.06 | 0.06 | 0.06 | 0.06 |
| | Thickness of heat-insulating layer | | | mm | 0.56 | 0.56 | 0.6 | 0.6 |
| Evaluation | Highest temperature of the reverse side of test piece during flame radiation | | | | 400 °C or less | 400 °C or less | 400 °C or less | 400 °C or less |
| | Strength after fire extinguishing | | | | Good | Good | Good | Good |
| | Expansion of heat-insulating layer | | | | Good | Good | Good | Good |
| | Flexural strength after combustion (N) | | | | — | — | — | — |

| Example No. and Comparative Example No. | | | | | Comp. Ex. 3 | Ex. 9 | Ex. 10 |
|---|---|---|---|---|---|---|---|
| Heat-insulating layer | Second resin composition | Unsaturated polyester resin | Unsaturated polyester resin of Synthesis Example 1 | Parts by mass | — | 60 | 60 |
| | | Vinyl ester resin | Vinyl ester resin of Synthesis Example 2 | Parts by mass | — | 10 | 10 |
| | | Polymerizable monomer | Styrene | Parts by mass | — | 10 | 10 |
| | | Low profile agent | Polystyrene solution | Parts by mass | — | 15 | 15 |
| | | | Polyethylene powder | Parts by mass | — | 5 | 5 |
| | | Aluminum hydroxide | | Parts by mass | — | 120 | 120 |
| | | Flame retardant | OP1230 | Parts by mass | — | 10 | 10 |
| | | | MC-4000 | Parts by mass | — | 10 | 10 |
| | | Expandable graphite | | Parts by mass | — | 2.5 | 2.5 |
| | | Polymerization inhibitor | p-benzoquinone | Parts by mass | — | 0.05 | 0.05 |
| | | Curing agent | t-butyl peroxyisopropyl carbonate | Parts by mass | — | 1 | 1 |
| | | | t-butyl peroxybenzoate | Parts by mass | — | — | — |
| | | Release agent | Zinc stearate | Parts by mass | — | 5 | 5 |
| | | Coloring agent | Black polyester toner | Parts by mass | — | 10 | 10 |
| | | Wetting and dispersing agent | Copolymer having an acid group | Parts by mass | — | 1.0 | 1.0 |
| | | | Alkylammonium salt of high-molecular weight copolymer | Parts by mass | — | 0.5 | 0.5 |
| | | | Phosphoric acid polyester | Parts by mass | — | — | — |
| | | Thickening agent | Magnesium oxide | Parts by mass | — | 0.8 | 0.8 |
| | | Thickness | | mm | — | 0.5 | 0.5 |
| | Inorganic nonwoven fabric | SB-140 | Glass fiber paper | — | — | — | — |
| | | CFZ-100RD | Carbon fiber paper | — | — | — | — |
| | | CFZ-500SD | Carbon fiber felt | — | — | — | — |
| | | MNA-600-100 | Glass fiber felt | — | — | Good | Good |
| | | Thickness of inorganic fiber | | mm | — | 0.3 | 0.3 |
| | Thickness of heat-insulating layer | | | mm | — | 0.8 | 0.8 |
| Evaluation | Highest temperature of the reverse side of test piece during flame radiation | | | | 600 °C or more | 400 °C or less | 400 °C or less |
| | Strength after fire extinguishing | | | | Bad | Good | Good |
| | Expansion of heat-insulating layer | | | | Bad | Good | Good |
| | Flexural strength after combustion (N) | | | | — | 25 or more | 25 or more |

TABLE 5

| Examples | | | | | Ex. 9 | Ex. 10 |
|---|---|---|---|---|---|---|
| Second heat-insulating layer | Third resin composition | Unsaturated polyester resin | Unsaturated polyester resin of Synthesis Example 1 | Parts by mass | — | 60 |
| | | Vinyl ester resin | Vinyl ester resin of Synthesis Example 2 | Parts by mass | — | 10 |
| | | Polymerizable monomer | Styrene | Parts by mass | — | 10 |
| | | Low profile agent | Polystyrene solution | Paris by mass | — | 15 |
| | | | Polyethylene powder | Parts by mass | — | 5 |
| | | Aluminum hydroxide | | Parts by mass | — | 120 |
| | | Flame retardant | OP1230 | Parts by mass | — | 10 |
| | | Flame retardant | MC-4000 | Parts by mass | — | 10 |
| | | Expandable graphite | | Parts by mass | — | — |
| | | Polymerization inhibitor | p-benzoquinone | Parts by mass | — | 0.05 |
| | | Curing agent | t-butyl peroxyisopropyl carbonate | Parts by mass | — | 1 |
| | | Release agent | Zinc stearate | Parts by mass | — | 5 |
| | | Coloring agent | Black polyester toner | Parts by mass | — | 10 |

TABLE 5-continued

| Examples | | | Ex. 9 | Ex. 10 |
|---|---|---|---|---|
| Wetting and dispersing agent | Copolymer having an acid group | Parts by mass | — | 1.0 |
| | Alkylammonium salt of high-molecular weight copolymer | Parts by mass | — | 0.5 |
| Thickening agent | Magnesium oxide | Parts by mass | — | 0.8 |
| Inorganic fiber woven fabric | M100K104H | — | Good | — |
| | M205K104H | — | — | Good |
| Thickness of inorganic fiber | | mm | 0.1 | 0.2 |
| Thickness of cured product of molding material | | mm | 0.1 | 0.8 |

While the illustrative embodiments of the present invention are provided in the above description, such is for illustrative purpose only and it is not to be construed as limiting in any manner. Modification and variation of the present invention that will be obvious to those skilled in the art is to be covered by the following claims.

INDUSTRIAL APPLICABILITY

The laminated product of the present invention can suitably be used for, particularly, battery cases for electric vehicles.

DESCRIPTION OF REFERENCE NUMERALS

1 laminated product
2 molded layer
3 heat-insulating layer
4 second heat-insulating layer

The invention claimed is:

1. A laminated product sequentially comprising:

a molded layer made of a cured product of a reinforcing fiber and a first resin composition, wherein the reinforcing fiber is in the form of strand, and does not include an inorganic nonwoven fabric, and a heat-insulating layer made of a cured product of an inorganic nonwoven fabric and a second resin composition on one side in a thickness direction of the molded layer, wherein:

the first resin composition comprises a first resin component and first aluminum hydroxide, the second resin composition comprises a second resin component and second aluminum hydroxide, a blending ratio of the second aluminum hydroxide to 100 parts by mass of the second resin component is less than a blending ratio of the first aluminum hydroxide to 100 parts by mass of the first resin component, and wherein one surface in the thickness direction of the heat-insulating heat insulating layer is exposed.

2. The laminated product according to claim 1, wherein the second resin composition comprises expandable graphite.

3. The laminated product according to claim 1, wherein the first resin composition comprises expandable graphite.

4. The laminated product according to claim 1, comprising a second heat-insulating layer on the other side in the thickness direction of the molded layer, wherein the second heat-insulating layer comprises an inorganic fiber woven fabric.

5. The laminated product according to claim 1, wherein the blending ratio of the first aluminum hydroxide to 100 parts by mass of the first resin component is 30 parts by mass or more and 300 parts by mass or less, and the blending ratio of the second aluminum hydroxide to 100 parts by mass of the second resin component is 20 parts by mass or more and 130 parts by mass or less.

* * * * *